US006542876B1

(12) United States Patent
Kikuchi et al.

(10) Patent No.: US 6,542,876 B1
(45) Date of Patent: Apr. 1, 2003

(54) METHOD FOR PRODUCING MULTILAYERED OPTICAL FILTERS USING A GENETIC ALGORITHM AND A METHOD FOR OPERATING THE GENETIC ALGORITHM

(75) Inventors: Toshihiro Kikuchi, Miyagi-ken (JP); Yoshihiro Someno, Miyagi-ken (JP); Toshio Hirai, Miyagi-ken (JP); Yoshiyuki Kawazoe, Miyagi-ken (JP); Hiroshi Mizuseki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/535,297

(22) Filed: Mar. 24, 2000

(30) Foreign Application Priority Data

Mar. 26, 1999 (JP) .......................................... 11-083063
Sep. 27, 1999 (JP) .......................................... 11-272573
Jan. 11, 2000 (JP) ....................................... 2000-006086

(51) Int. Cl.[7] ................................................ G06N 3/00

(52) U.S. Cl. .......................... 706/13; 359/896; 382/141

(58) Field of Search ............................... 706/13, 12, 45

(56) References Cited

U.S. PATENT DOCUMENTS

| 4,826,267 A | 5/1989 | Hall et al. ................... 359/586 |
| 5,841,947 A | 11/1998 | Nordin ......................... 706/13 |
| 5,864,633 A | * | 1/1999 | Opsal et al. ................. 382/141 |

OTHER PUBLICATIONS

Bäck et al., "Evolution Strategies for Mixed–Integer Optimization of Optical Multilayer Systems", Proceedings of the Annual Conference on Evolutionary Programming, 1995, pp. 33–51, XP002040793, San Diego, USA.

Martin et al., "Synthesis of Optical Multilayer Systems Using Genetic Algorithms", Applied Optics, US, Optical Society of America, Washington, vol. 34, No. 13, May 1, 1995, pp. 2247–2254, XP002040790, ISSN: 0003–6935.

Eisenhammer et al., "Optimization of Interference Filters With Genetic Algorithms Applied To Silver–Based Heat Mirrors", Applied Optics, US, Optical Society of America, Washington, vol. 32, No. 31, Nov. 1, 1993, pp. 6310–6315, XP000403649, ISSN: 0003–6935.

Martin S. et al.: "Synthesis of Optical Multilayer Systems Using Genetic Algoriths" Applied Optics, US, Optical Society of America, Washington, vol. 34, No. 13, May 1, 1995, pp. 2247–2254.

(List continued on next page.)

*Primary Examiner*—John A. Follansbee
*Assistant Examiner*—Joseph P. Hirl
(74) *Attorney, Agent, or Firm*—Brinks Hofer Gilson & Lione

(57) ABSTRACT

A method of producing multilayered optical filters by using a genetic algorithm that determines an optimal combination of refractive indexes and thicknesses for each layer of the filter is described. The method generates initial values for the component and places the values within a matrix P, where $P=(X1, X2, X3, \ldots, Xi, \ldots, Xs)$ and Xi is an elementary matrix that includes the refractive index and thickness of each layer i. The method may generate mutated patterns by increasing or decreasing the thicknesses and refractive indexes of the initial pattern. It may also perform a cross-over process, selecting patterns from grouping of mutated patterns. Alternately, the method may perform a process where selected patterns having optical characteristics closest to the desired characteristics from the initial, mutated or crossover patters are chosen. The genetic algorithm utilizing the above processes repeats until the optical characteristics fall within the desired range.

23 Claims, 26 Drawing Sheets

OTHER PUBLICATIONS

Michielssen E. et al.: "Optical Multilayer Filter Design Using Real Coded Genetic Algorithms" IEE Proceedings J. Optoelectronics, GB, Institution of Electrical Engineers. Stevenage, vol. 139, No. 6, Part J, Dec. 1, 1992, pp. 413–420.

Greiner H.: "Robust Optical Coating Design with Evolutionary Strategies" Applied Optics, US, Washington, vol. 35, No. 28, Oct. 1, 1996, pp. 5477–5483.

Sequeira R.A. et al.: "Automating the Parameterization of Mathematical Models Using Genetic Algorithms" Computers and Electronics in Agriculture, NL, Amsterdam vol. 11, Jan. 1, 1994, pp. 265–290.

Baeck T. et al. "Evolution strategies for mixed–integer optimization of optical multilayer systems" Proceedings of the Annual Conference on Evolutionary Programming, 1995, pp. 33–51, XP002040793 San Diego, USA.

Eisenhammer T. et al. "Optimization of Interference Filters With Genetic Algorithms Applied To Silver–Based Heat Mirrors" Applied Optics, US, Optical Society of America, Washington, vol. 32, No. 31, Nov. 1, 1993, pp. 6310–6315, XP000403649 ISSN: 0003–6935.

* cited by examiner

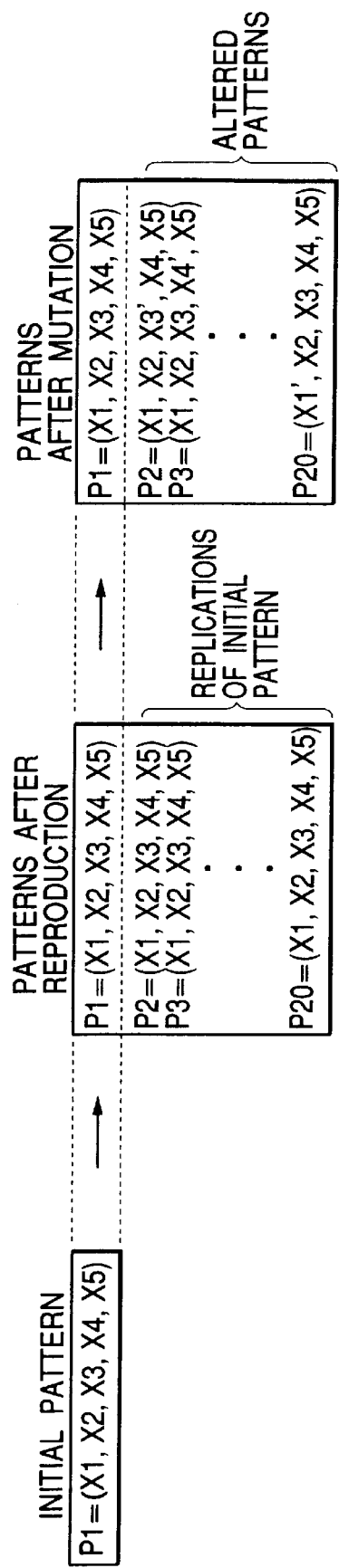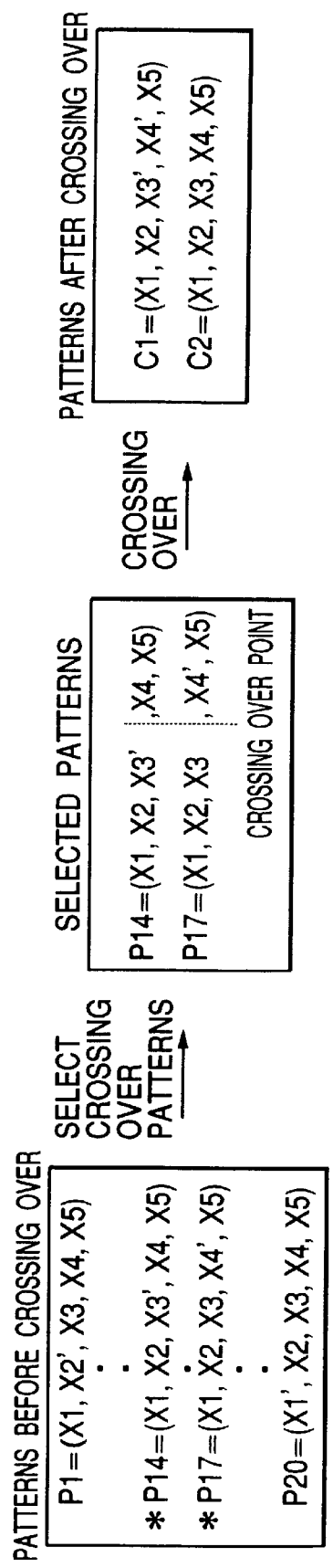

METHOD FOR PRODUCING MULTILAYERED OPTICAL FILTERS USING A GENETIC ALGORITHM AND A METHOD FOR OPERATING THE GENETIC ALGORITHM

BACKGROUND OF THE INVENTION

1. Field of the Invention

The present invention relates to a method for producing optical multilayered optical filters, for appropriately splitting/merging signal lights having plural wavelength convoluted, used in an optical communication system sending/receiving wavelengths multiplexed light communications, and to a method for ICE operating the genetic algorithm for extracting the most suitable combination from candidates of complex combination.

2. Description of the Prior Art

As wavelength-multiplexed light communications have been developed, there are needs for multilayered splitting/merging filters having such characteristics as a narrow passband or small para-reflex characteristics.

For methods of designing multilayered optical filters each layer of which has refractive index $N_i$ and thickness $D_i$ based on a desired optic characteristics, in general, it has been common to use a method of thickness optimization such as described in Japanese Published Unexamined Patent Application No. 2650048, by determining in advance refractive index $N_i$ of each layer composing the filter, to preset the thickness $D_i$, to determine optical characteristics for each wavelength, to change the thickness $D_i$, to optimize the thickness $D_i$ so as to have maximum in the optical characteristics.

As another method of optimization, there is only a trial and error method in which refractive index of a layer is altered, and the thickness for every layer is optimized again.

In accordance with the method as described above, since the refractive index $N_i$ is predetermined, the degree of freedom of design is not insufficient, and furthermore the results may often fall into a local solution.

In addition, there are a huge number of combinations of $N_i$ and $D_i$ in a multilayered optical filter so that the optimization requires very long time for selection; therefore the selection of the most optimized combination has been practically impossible.

In the Prior Art local resolution obtained by using the thickness optimization method as have been described above was needed and the only practical result.

BRIEF SUMMARY OF THE INVENTION

The present invention been made in view of the above circumstances and has an object to overcome the above problems and to provide a method of production of multilayered optical filters, used in the designing of multilayered optical filters having such complex combinations as described above, for selecting the most optimized combination of refractive index $N_i$ and thickness $D_i$ for each of layers without falling into a local solution.

Also, the inventors of the present invention have been realized a method for selecting the most optimized solution, in order to determine the most optimized or almost optimized solution, in which a genetic algorithm (abbreviated as GA hereinafter) are used for converting the problems of optimization into the genetic sequences, such as the problems of optimization of the combinations of refractive index $N_i$ and thickness $D_i$ in each layer in the designing of multilayered optical filters, comprising the steps of:

generating pattern groups, for generating pattern groups each comprised of a plurality of patterns;

extracting at least two patterns from within the generated group of patterns;

mutating and crossing over for generating new patterns by mutating or crossing over the extracted patterns;

evaluating for calculating the fitness of the optimization problem of the groups comprising the extracted patterns and newly generated patterns, for each of mutation and cross-over steps;

selecting to decrease the number of groups including extracted patterns and newly generated patterns to the number of extracted patterns;

substituting the selected patterns in place of the patterns extracted from the pattern groups, and altering the contents of pattern groups by repeating between the extracting step and the selecting step.

The step of selecting in the genetic algorithm comprises either elite method, for selecting patterns of the predetermined numbers in the order of fitness among the object pattern group and removing others, or elite-roulette method, for selecting some patterns by using the elite method, and others by using the roulette method and removing the rest.

In both selection methods, there is no restriction of pattern selection, so that any duplicated patterns having the identical pattern elements were not rejected. If the selected patterns are filled with patterns having the identical elements, in some optimization problems, patterns having the same elements are inserted into the pattern group, and after repeating the genetic algorithm steps as described above, pattern group are totally filled with the patterns having the identical elements. This may result in an unexpected error in the retrieval search of the most optimized solution.

Often the search results obtained by the GA as above may be a local solution, which may or may not satisfy the goal.

Another object of the present invention is to avoid, in GA the predominance of selected pattern and of pattern group with the patterns having the same elements by preventing the patterns having the identical elements from coexisting in the selection patterns in order to retrieval search not only a local solution but also the most suitable one.

A method for producing multilayered optical filters comprises:

a generating step for generating a initial pattern comprising a matrix given by $$P=(X1, X2, X3 \ldots, XS) \qquad (1)$$

which is comprised of elemental matrices $X_i$, each of which comprises as element refractive index and thickness of i layers (i is an integer equal to or more than 1) of a multilayered optical filter having S layers (S is an integer equal to or more than 1);

a reproducting/mutating step for either increasing or decreasing, in an arbitrary element $X_i$ of the initial pattern, either the refractive index or thickness of the initial pattern by a predetermined number, in terms of the initial pattern, to generate a predetermined number of mutation patterns which are mutually different one from other;

a cross over step for selecting at least one pair of patterns from the mutated patterns generated in the reproducting/mutating step and the initial patterns to cross over, in the pair of patterns selected, the matrix $X_i$ in the pattern and/or the matrix obtained by the mutation of the matrix by the predetermined number to generate a predetermined number of crossed over patterns;

a selecting step for selecting the desired number of patterns having the most appropriate optical characteristics from the mutated pattern group generated in the reproducting/mutating step, the crossed over pattern group, and the pattern group comprised of the initial patterns; and a repeating step for repeating a series of algorithmic process steps comprised of the reproducting/mutating step, the cross over step, and the selecting step,in terms of the predetermined number of patterns selected in the selecting step instead of the initial patterns, until the optical characteristics of the selected patterns obtained in the immediately preceding algorithmic steps may conform to the desired error range for the desired optical characteristics.

In accordance with the method of producing multilayered optical filters in accordance with the present invention, the repetition of a series of algorithmic process steps allows each layer in a multilayered optical filter to be set in such a manner as the optic characteristics may conform to a specific desired range. This may result in a better design and production of multilayered optical filters when compared with the conventional designing method.

When a series of the algorithmic process steps comprised of the reproducting and mutating step, the cross over step, and the selecting step, if the optical characteristics of the selected pattern obtained from the algorithmic process steps match with the optical characteristics of the selected pattern obtained from one of the repetitions preceding to the former, a second initial pattern, which is different from the initial pattern, is preferably set to repeat the algorithmic process steps using this second initial pattern.

In accordance with the method disclosed herein, even when the optical characteristics of the design obtained by the repetition of a series of algorithmic process steps show no progress in improvement, then the algorithm may recover from this stacked condition by restarting from the second initial pattern.

Preferably, the second initial pattern may be chosen which is generated by either increasing or decreasing the refractive index or the thickness in the selection patterns having the most appropriate optical characteristics obtained in the preceding process steps.

In accordance with the method disclosed herein, the information about optical elements, effective to the improvement of optical characteristics, in the patterns generated until the optical characteristics have been matched with, may be effectively used for the second initial pattern, allowing better and faster design of multilayered optical filters with better optical characteristics.

Another method for producing multilayered optical filters comprises:

a generating step for generating a initial pattern comprising a matrix given by $$P=(X1, X2, X3 \ldots, XS) \quad (1)$$

which is comprised of elemental matrices Xi, each of which comprises as element refractive index and thickness of i layers (i is an integer equal to or more than 1) of a multilayered optical filter having S layers (S is an integer equal to or more than 1);

a first reproducting/mutating step for duplicating a predetermined number of patterns from the initial pattern for either increasing or decreasing, in an arbitrary element Xi of the duplicated pattern, either the refractive index or thickness of the initial pattern by a predetermined number;

a first selecting step for selecting the desired number of patterns having the most appropriate optical characteristics from the groups consisted of the mutation patterns generated in the immediately preceding step and the initial pattern;

a cross over step for selecting at least one set of a pair of patterns from the selected patterns generated in the selection step to cross over, the matrix Xi in the pattern and/or the matrix obtained by the mutation of the matrix by the predetermined number to generate a predetermined number of crossed over patterns;

a second reproducting/mutating step for selecting and replicating at least one arbitrary pattern from the pattern groups consisted of the crossed over pattern group and the selected pattern group, to generate mutated pattern by either increasing or decreasing, in an arbitrary element Xi of the duplicated pattern and/or in an element of the matrix obtained by the mutation of the matrix by the predetermined number;

a second selection step for selecting the desired number of patterns having the most appropriate optical characteristics from the pattern groups consisted of the mutated pattern group, the crossed over pattern group, and the selected pattern group;

a repeating step for repeating a series of algorithmic process steps comprised of the first reproducting/mutating step, the first selecting step, the cross over step, the second reproducting/mutating step, and the second selecting step, in terms of the predetermined number of patterns selected in the second selecting step instead of the initial pattern, until the optical characteristics of the second selected patterns obtained in the immediately preceding algorithmic steps may conform to the desired error range for the desired optical characteristics.

In accordance with another method of producing multilayered optical filters in accordance with the present invention, the repetition of a series of algorithmic process steps allows each layer in a multilayered optical filter to be set in such a manner as the optic characteristics may conform to a specific desired range. This may result in a better design and production of multilayered optical filters when compared with the conventional designing method.

When a series of the algorithmic process steps comprised of the first reproducting/mutating step, the first selecting step, the cross over step, the second reproducting/mutating step, and the second selecting step, if the optical characteristics of the second selected pattern obtained from the algorithmic process steps match with the optical characteristics of the second selected pattern obtained from one of the repetitions preceding to the former, a second initial pattern, which is different from the initial pattern, is preferably set to repeat the algorithmic process steps once again using this second initial pattern.

In accordance with the method disclosed herein, even when the optical characteristics of the design obtained by the repetition of a series of algorithmic process steps show no progress in improvement, then the algorithm may recover from this stacked condition by restarting from the second initial pattern.

Preferably, the second initial pattern may be chosen which is generated by either increasing or decreasing the refractive index or the thickness in the second selected patterns having the most appropriate optical characteristics obtained in the preceding process steps.

In accordance with the method disclosed herein, the information about optical elements, effective to the improvement of optical characteristics, in the patterns generated until the optical characteristics have been matched with, may be effectively used for the second initial pattern, allowing better and faster design of multilayered optical filters with better optical characteristics.

It is preferable to perform selection in the selecting step or the first and second selecting steps based on the order of Qj, largest-first, the Qj being given by:

$$Q = \frac{1}{\left\{\sum_{\lambda}(Rj(\lambda) - Rr(\lambda))^2\right\}} \quad (2)$$

where $Rj(\lambda)$ is the reflectance characteristics at each wavelength $\lambda$ obtained from the pattern combination of elements in the matrix Xi, $Rr(\lambda)$ is the desired reflectance characteristics.

If the disjunction X of the reflectance of a pattern combination from the desired reflectance characteristics, i.e., the denominator item of Q shrinks by the convergence, and the difference of X among patterns becomes small, larger difference among patterns can be taken because the Q is used as the fitness. Therefore finer extraction becomes possible even when the difference of X among patterns is small.

When the predetermined value of increasing or decreasing the refractive index and the predetermined value of increasing or decreasing the thickness in the second reproducting/mutating step is set to be 2 through 50 times, respectively, of the predetermined value of increasing or decreasing the refractive index and the predetermined value of increasing or decreasing the thickness in the first reproducting/mutating step, the convergence, around the solution may increase and the most appropriate solution may be extracted faster.

When the predetermined value of increasing or decreasing the refractive index and the predetermined value of increasing or decreasing the thickness in the second reproducting/mutating step is set to be 2 through 25 times of the predetermined value of increasing or decreasing the refractive index and the predetermined value of increasing or decreasing the thickness in the first reproducting/mutating step, the convergence around the solution increases more and the most appropriate solution may be extracted more faster.

The method of operating genetic algorithm in accordance with the present invention comprises:

pattern group generating step for generating pattern group consisted of a plurality of mutually different patterns, each of which patterns comprises elemental matrices Xi, and given by $$P = (X1, X2, X3 \ldots, XS) \quad (1)$$

a manipulating step for extracting a predetermined number of patterns from the pattern group and operate on the elements of these patterns to generate operated patterns;

a selecting step for selecting the same number of patterns having mutually different characteristics from the extracted patterns and operated patterns based on the characteristics obtained from these patterns;

a substituting step for adding a predetermined patterns selected in the selecting step into the pattern group in place of the extracted patterns; and a repeating step for repeating a series of algorithmic process steps comprised of the operating step, the selecting step, and the substituting step, until the best characteristics in the preceding pattern group obtained in the algorithmic process steps may conform to the desired error range for the desired characteristics.

In accordance with the method of operating on a genetic algorithm, in the GA, patterns having the identical elements in the selected patterns may not coexist, thus preventing the occupation of selected patterns by the pattern having the identical elements as well as the occupation of pattern groups, in order to allowing retrieval search to proceed until the best solution is found.

Preferably, the manipulating step may comprise a cross over step for extracting at least one set of a pair of patterns consisted of mutually different elements, swapping a part of the matrix in the patterns between thus extracted pattern pair to generate crossed over patterns.

In accordance with the method disclosed herein, since the cross-over is performed between patterns having mutually different elements, the crossed over patterns may be prevented from being identical to the extracted patterns. In addition, in the same process step, a new pattern having partial combination of elements effective to find the best solution in the pattern may be generated.

Preferably, the manipulating step may comprise a mutating step for extracting a predetermined number of patterns, mutating a part of the matrix of the pattern in the extracted patterns to generate mutated patterns.

In accordance with the method disclosed herein, a new pattern having partial combination of elements effective to find the best solution in the pattern and completely new elements in other parts may be generated.

Preferably, mutation method may be either a method of increasing or decreasing any element constituting the pattern by the predetermined amount of mutation, or substituting with one of predetermined candidate elements.

Former method may be effective when the genetic algorithm is applied to such a problem of finding the best solution that a solution of contiguously transforming functions should be determined, while on the other hand the latter may be effective when the genetic algorithmic is applied to such a problem of finding the best solution of combination that uses dissociative candidates.

Preferably, the operating step may comprise, in addition to the cross-over step, a mutating step for extracting a predetermined number of patterns and mutating a part of matrix of the patterns in the extracted patterns to generate mutated patterns.

The relationships between the cross-over step and the mutation step in the operating step is preferably such that the cross-over may be performed at first and then the mutation step may be performed thereafter. However, the mutation may be performed at first and then the cross-over, or either one of cross-over and mutation may be selectively performed for each repetition of the series of algorithmic process steps constituted of operating step, selecting step, and substituting step, or the cross-over and mutation may be alternatively performed for each repetition of the series of algorithmic process steps constituted of operating step, selecting step, and substituting step.

In accordance with the method as described above, diverse patterns may be newly generated by making use of both cross-over and mutation.

Preferably, the patterns selected in the selecting step may be comprised of the pattern having the best characteristics and the patterns selected by the roulette method.

In accordance with the method as described above, if there are the same patterns in the pattern groups comprised of manipulated patterns and extracted patterns, the best pattern and another pattern that is comprised of elements different from the best pattern and of elements mutually different each from other may be selected.

Preferably, the patterns selected in the selecting step may be comprised of the pattern having the best characteristics and the patterns selected by the random number method.

In accordance with the method as described above, if there are the same patterns in the pattern groups comprised of manipulated patterns and extracted patterns, a pattern may be selected which is comprised of elements different from the best pattern and of elements mutually different each from other.

Preferably, when the substitution step comprises a comparing step for comparing the characteristics of each pattern in the pattern group to be substituted in the substitution step with the characteristics of selected pattern, if there is a pattern having the identical characteristics to that of the selected pattern in the pattern group to be substituted in the substitution step, the substitution step may be omitted to proceed immediately to the operating step.

In accordance with the method disclosed herein, if there is already the selected pattern in the pattern group, the operating step may be repeated to prevent the identical patterns from occupying to allowing retrieval search to proceed until the best solution is found.

Although the steps of operating, substituting, and determining whether the algorithm has been completed, use the characteristics specific of patterns, the fitness of characteristics specific to patterns for each patterns with respect to the target characteristics may be determined and used instead. The decision of end of algorithm in this case is preferably such that the difference between the best fitness in the pattern group and the target fitness may be fitted into the error range of the target.

In accordance with the method disclosed herein, if the pattern characteristics are expressed by a plurality of values, the object to be compared with may be one fitness indication by determining the fitness with respect to the target characteristics, allowing the computational cost of comparison to be reduced.

The best values most suitable to the thickness of each layer and the refractive index may be readily determined when designing multilayered optical filters by applying the method of operating on the genetic algorithm in accordance with the present invention. In such a case the elements of matrix Xi in the patterns should preferably be the thickness di and refractive index ni of the layer i.

In accordance with the method disclosed herein, the thickness di and refractive index ni of the layer i, the principal elements constituting the multilayered optical filters, may be simultaneously optimized, enabling larger freedom of design.

Additional objects and advantages of the invention will be according to part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention in the drawings.

FIG. 15 shows a schematic diagram illustrating reproduction and mutation process in the flowchart shown in FIG. 14;

FIG. 17 shows a schematic diagram illustrating cross-over process in the flowchart shown in FIG. 14;

DESCRIPTION OF THE PREFERRED EMBODIMENTS

First Embodiment

Figure 1:
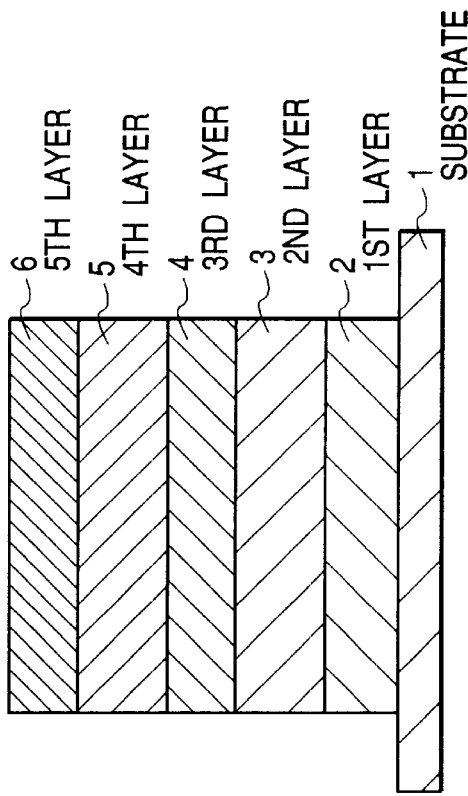
FIG. 1 shows a cross-sectional view of a multilayered optical filter with 5 layers, produced in accordance with first preferred embodiment of the present invention.

A preferred embodiment in accordance with the present invention will be described below in greater details with reference to the accompanying drawings. In first preferred embodiment, the calculation for optimizing a multilayered optical filter comprised of five layers from the first layer 2 through fifth layer 6 formed on a substrate 1 as shown in FIG. 1. In first preferred embodiment an algorithm is used which comprises the steps of generating initial pattern, first reproduction and mutation, first selection, cross-over, second reproduction and mutation, and second selection.

Figure 2:
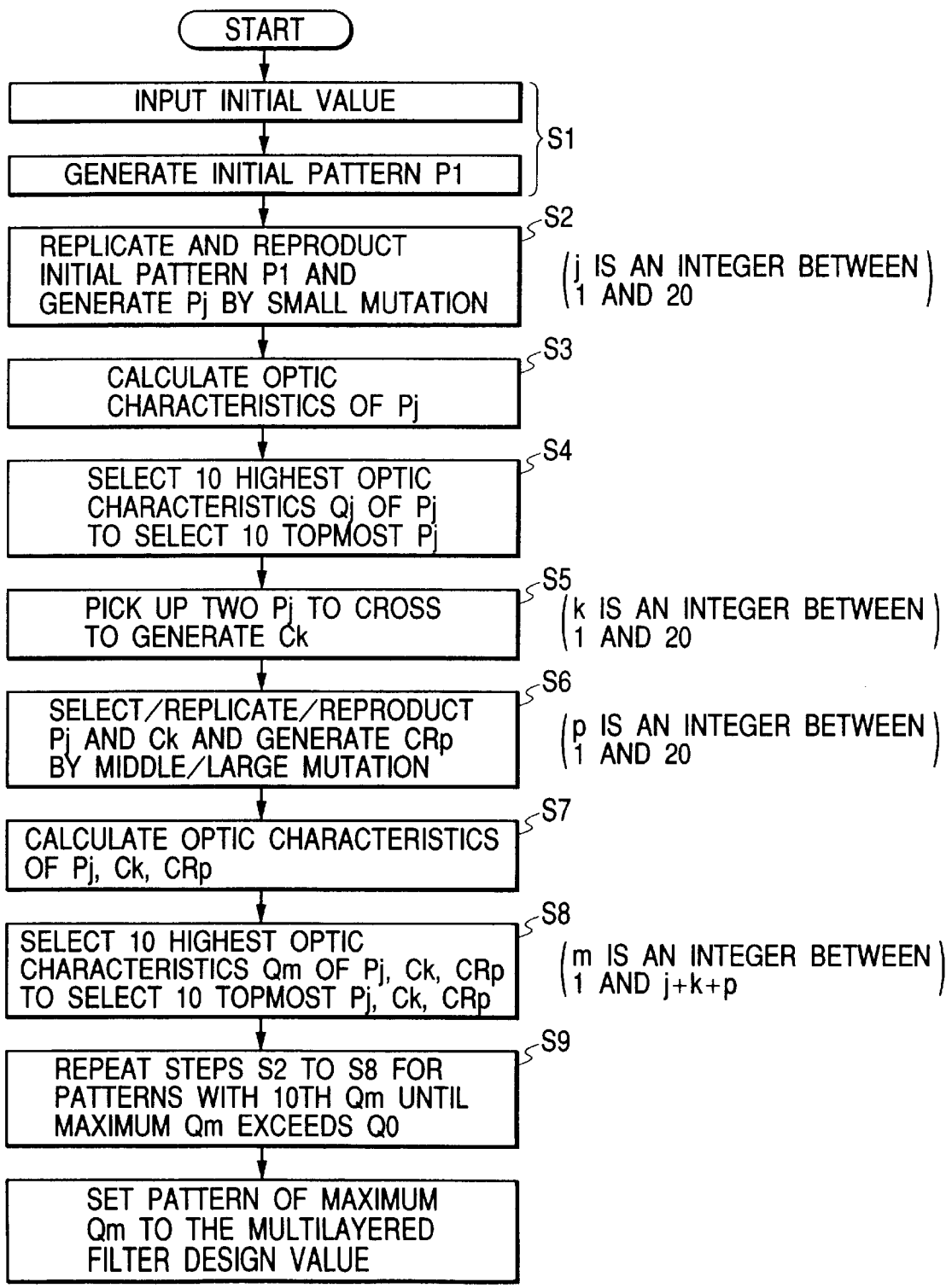
FIG. 2 shows a flowchart illustrating first preferred embodiment of the present invention.

FIG. 2 shows a flowchart of designing a multilayered optical filter comprising five layers in accordance with first preferred embodiment of the present invention.

The first reproduction and mutation step is assumed to be a reproduction and small mutation process step, and the second reproduction and mutation step to be a selection, reproduction and middle/large-scaled mutation process step.

In the present preferred embodiment, random number $\alpha(=A, B, C, D, E, F, G, H)$ should be used in the operations of selection, extraction, deselection, cross-over, and mutation designated in steps S2 through S8. The way how to generate this random number $\alpha$ is the congruence method given by the following equations (3) and (4):

$$\alpha = Mn+2/10000 \tag{3}$$

$$Mn+2 = MOD(Mn+1+Mn, 10000) \tag{4}$$

where MOD is a function designating to a modulus.

In step S, the initial values required for calculation (desired optical characteristics; total number of film layers; refractive index of the substrate; incident angle of the incident light; total number of patterns after the reproduction and small mutation process step; total number of patterns after the first selection step; total number of patterns after cross over step; total number of patterns after the selection, reproduction and middle/large-scaled mutation process step; total number of patterns after the second selection step; amount of small mutation; amount of middle/large-scaled mutation; number of repetition of the middle/large-scaled mutation step; target value of the fitness) or the range of numbers are specified.

The matrix $Xi$ comprising the refractive index $Ni$ and thickness $Di$ as elements in the layer i of the multilayered film j may be expressed as following equation (5):

$$Xi = (Ni, Di) \tag{5}$$

By inputting initial values for element of each layer $Xi=(Ni, Di)$ a matrix pattern $Pj$ as expressed in (6) may be generated, which is constituted of the combination of $Xi$, indicating the multilayered film j (step of generating initial pattern group):

$$Pj = (X1, X2, \ldots, Xi, \ldots) \tag{6}$$

In the present embodiment, the initial values required for the calculation in step S1 are as shown in Table 1. A pattern P1 of combination of elements as expressed in the following expression (7) may be generated by the operation as described above:

$$P1 = (X1, X2, X3, X4, X5) \tag{7}$$

TABLE 1

| | | |
|---|---|---|
| Number of initial patterns | | 1 |
| Reproduction/small mutation step | Total number of patterns after step | 20 |
| | Amount of small mutation | $\Delta nz, \Delta dz$ |
| First selection step | Total number of patterns after step | 10 |
| Selection and cross-over step | Total number of patterns after step | 20 |
| Selection, reproduction and middle/large-scaled mutation step | Total number of patterns after step | 40 |
| | Amount of middle-scaled mutation | $\Delta nc, \Delta dc$ |
| | Number of repetition of middle-scaled mutation | 5 |
| | Amount of large-scaled mutation | $\Delta nd, \Delta dd$ |
| | Number of repetition of large-scaled mutation | 10 |
| Second selection step | Total number of patterns after step | 10 |
| Target value of fitness | | Q0 |

Figure 3:
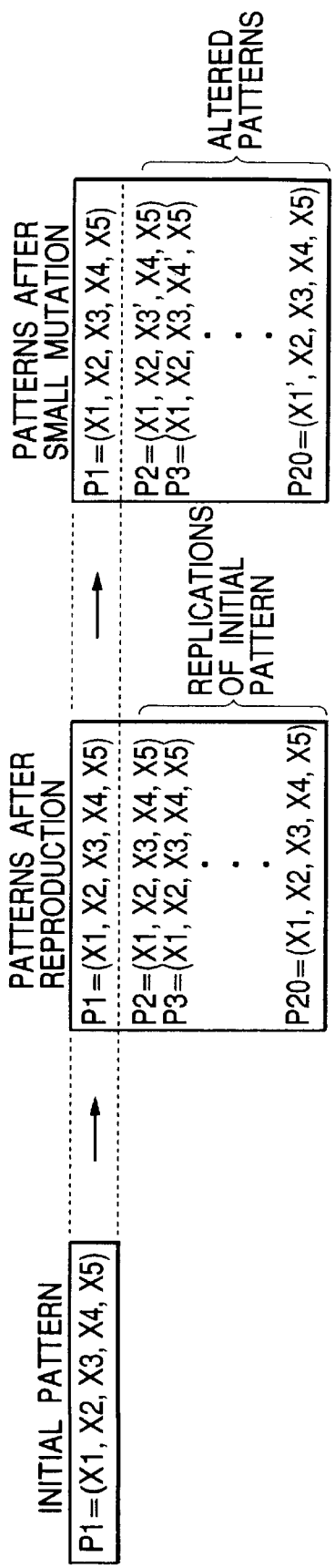
FIG. 3 shows a schematic diagram illustrating the reproduction and small-scaled mutation process in the flowchart shown in FIG. 2.

Then, in step S2, the initial pattern is replicated to increase the total number of pattern group up to the number of patterns after the reproduction step (shown in FIG. 3).

In the present embodiment, total number of pattern groups after this operation will be P1 through P20, patterns being expressed as the following equation (8):

$$P1 = P2 = P3 \ldots = P20 \tag{8}$$

Figure 4:
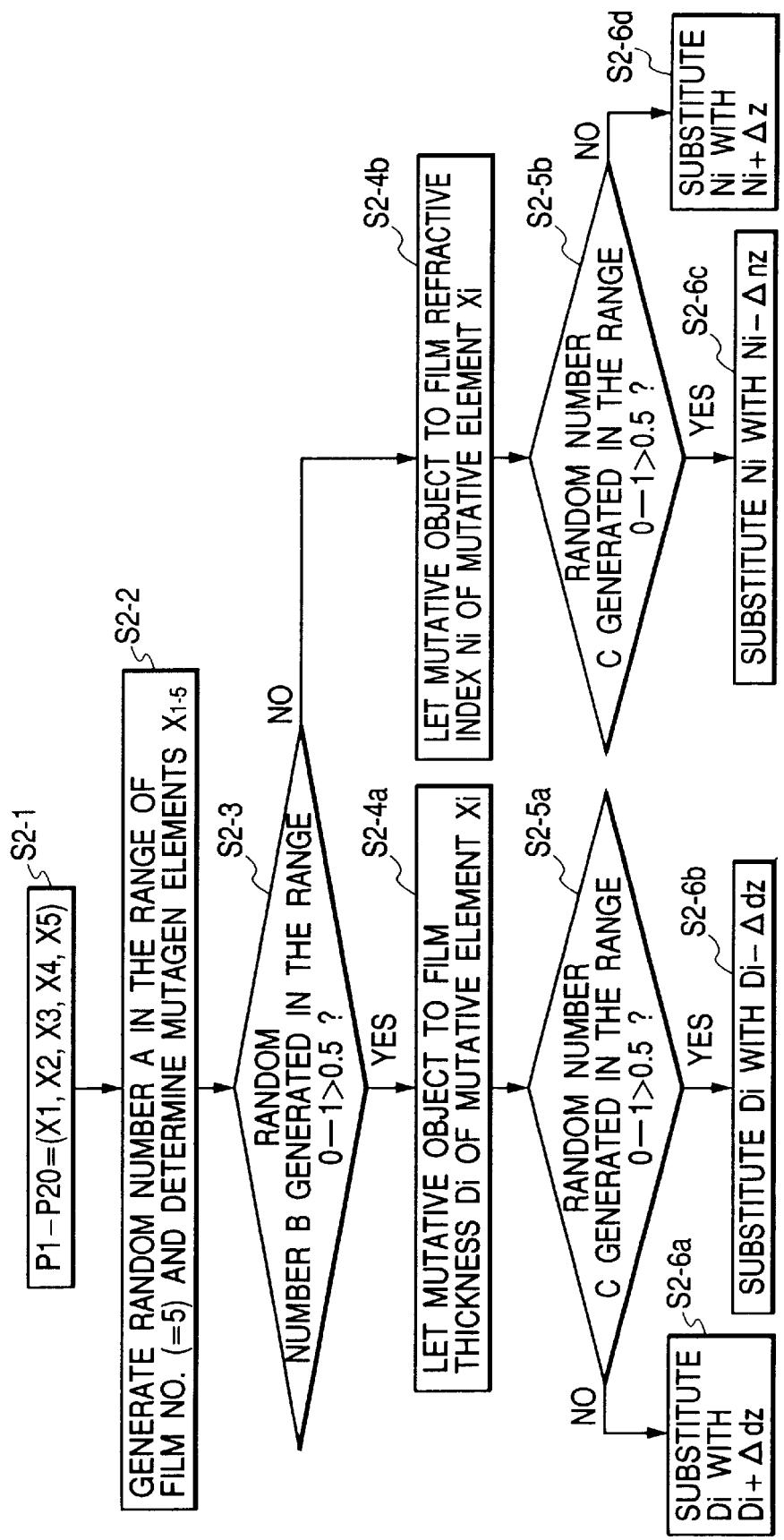
FIG. 4 shows a flowchart illustrating the small-scaled mutation process in the flowchart shown in FIG. 2.

Then, small mutation is performed on each of the replicated patterns P2 through P20 (as shown in FIG. 4). A random number A is generated in the range of $1 \leq A \leq 5$ (=number of layers), and one element $Xi=\{(Ni, Di)\}$ in the patterns is selected by using the random number A (step S2-2) Then, another random number B is generated in the range $0 \leq B \leq 1$ (step S2-3), and Di will be selected if the random number B is equal to or more than 0.5 (step S2-4a), Ni will be selected if B is less than 0.5 (step S2-4b). Then, still another random number C is generated in the range of $0 \leq C \leq 1$ (steps S2-5a, S2-5b), and + is selected if the random number C is less than 0.5 (steps S2-6a, S2-6d), will be selected if C is equal to or more than 0.5 (steps S2-6b, S2-6c). Small mutation of either positive or negative (+ or $-\Delta nz$, or + or $-\Delta dz$) is performed on Ni or Di by the above operation (reproduction/small mutation step S2).

In the present embodiment, assuming that random numbers are A=3, B=0.2, and C=0.6 with respect to the replicated pattern P2, then the P2 by the operation above may be expressed as the following equation (9) below:

$$P2=(X1, X2, X3, X4, X5)=\{X1, X2, (N3+\Delta nz, D3) X4, X5\} \quad (9)$$

As shown in FIG. 2, in step S3, respective optical characteristics for each of patterns of combination of elements P1 through P20 generated through S2 will be calculated in order to calculate the difference from the desired optical characteristics. The optical characteristics are referenced to as the reflection characteristics of the multilayered optical filter with respect to the incident light incident to the filter at the incident angle $\theta$. It should be noted that the transmission characteristics may be used as the optical characteristics, instead of the reflection characteristics. Assuming that the reflection characteristics with respect to each wavelength $\lambda$ of incident light for respective pattern Pj of combination of elements is Rj ($\lambda$), the desired reflection characteristics is Rr ($\lambda$), the bandwidth of wavelength of the desired reflection characteristics is $\lambda 1$ through $\lambda 2$, and the square of difference between Rj ($\lambda$) and Rr ($\lambda$) in $\lambda 1$ through $\lambda 2$ is X, then X may be expressed by the following equation (10):

$$X = \sum_\lambda (Rj(\lambda) - Rr(\lambda))^2 \quad (10)$$

and the fitness Qj may be expressed by the following equation (2):

$$Q = \frac{1}{\left\{\sum_\lambda (Rj(\lambda) - Rr(\lambda))^2\right\}} \quad (2)$$

That is, the larger the value Qj is, then the optical characteristics of the multilayered optical filter comprising that pattern of combination of elements are closer to the desired value.

Figure 5:
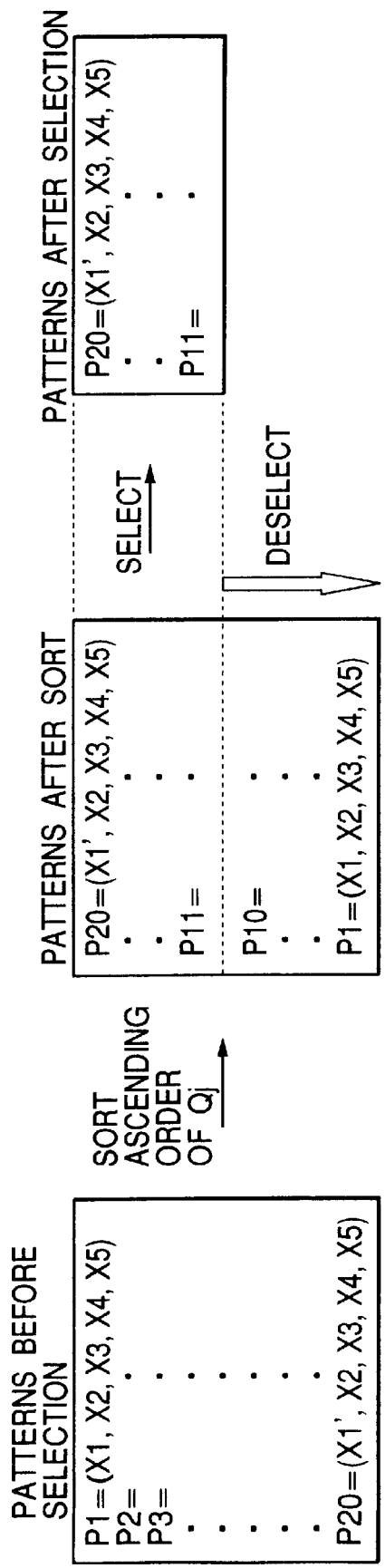
FIG. 5 shows a schematic diagram illustrating first selection process in the flowchart shown in FIG. 2.

Next, based on the fitness Qj with respect to the desired optical characteristics of the pattern Pj of combination of elements, calculated in step S3, as shown in FIG. 2, patterns of combination of elements are selected (shown in FIG. 5). To do this, Pj are sorted in the order of the fitness Qj from highest to lowest, then the sorted patterns are picked up by the number corresponding to the total number of patterns after selection from the highest. Patterns other than those picked up are deselected to reject (primary selection step S4).

In the case of the present embodiment, if the size of fitness Q1 through Q20 are in the order as expressed by the equation (11) below:

$$Q20>Q19>Q18> \ldots >Q3>Q2>1 \quad (11)$$

since the total number of individuals after selection is 10, the patterns of combination of elements extracted by the foregoing operation will be P11 through P20.

Figure 6:
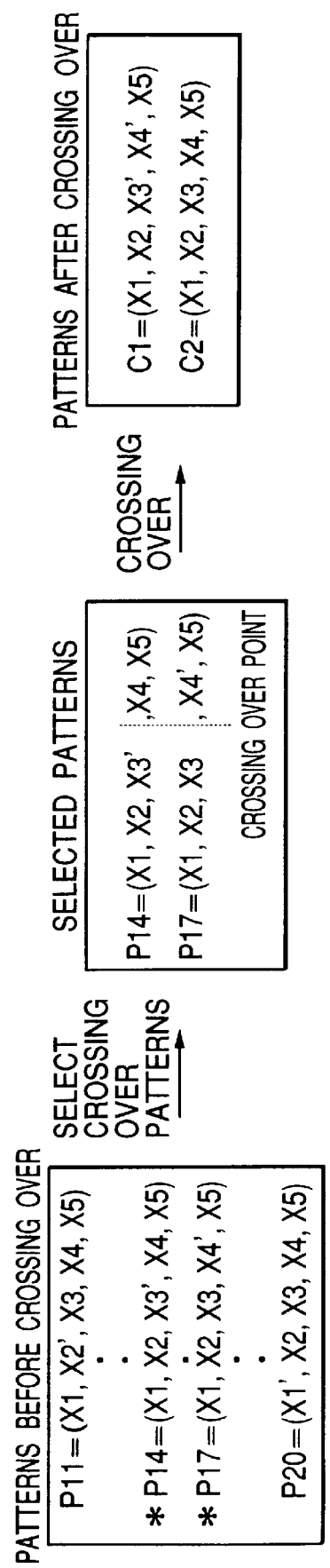
FIG. 6 shows a schematic diagram illustrating cross-over process in the flowchart shown in FIG. 2.
Figure 7:
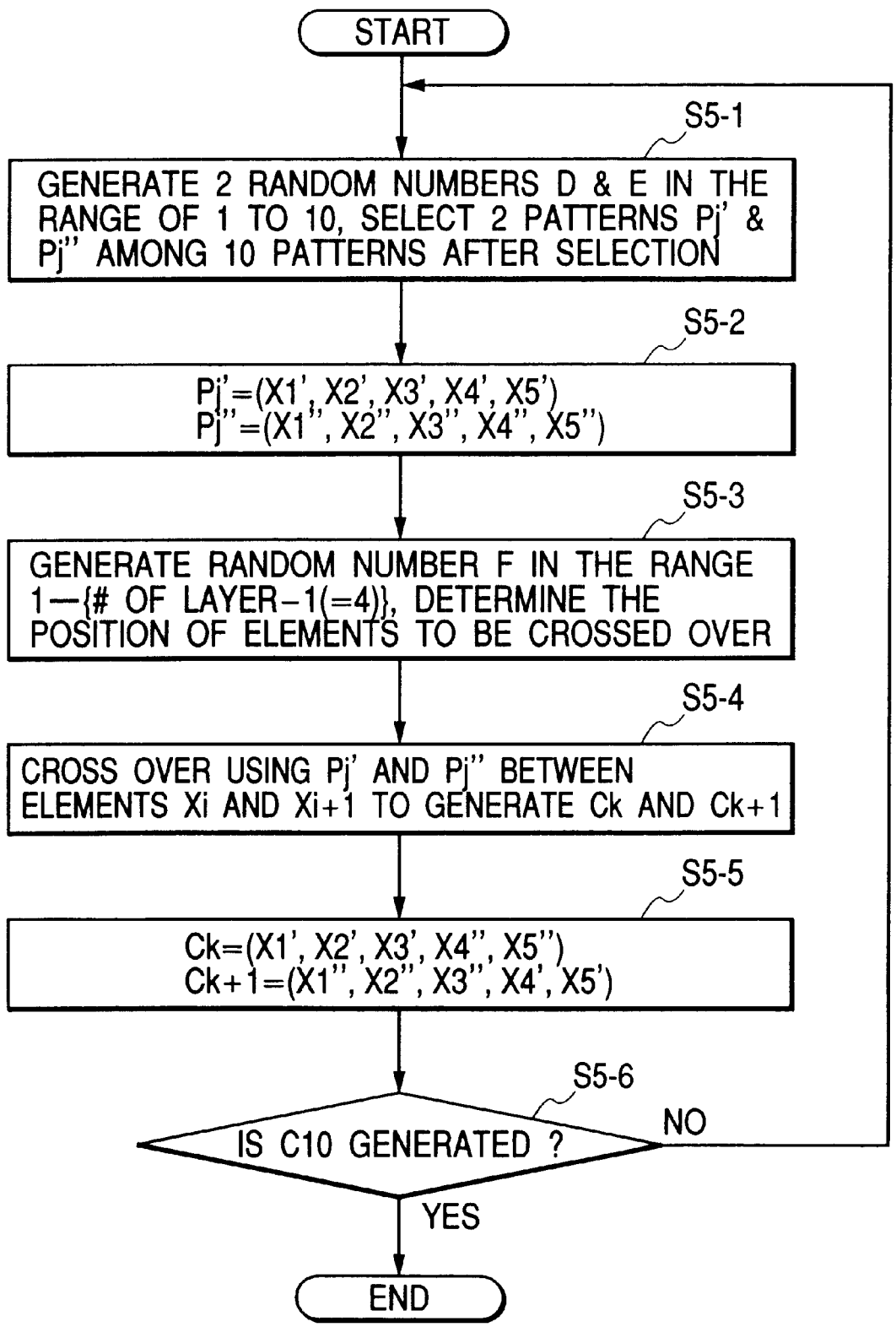
FIG. 7 shows a flowchart illustrating cross-over process in the flowchart shown in FIG. 2.

Then, as shown by step, S5 in FIG. 2, patterns are crossed over (shown in FIG. 6 and FIG. 7). FIG. 6 shows the generation of patterns in one cross-over step, while FIG. 7 shows a flowchart of cross over step including repetition.

Here two random numbers D and E are generated in the range $1 \leq D$, $E \leq 10$ (=total number of patterns after selection), then based on these random numbers D and E two patterns Pj' and Pj" (where $1 \leq j'$, $j" \leq j$) are picked up from among pattern groups P1 through P10 of combination of elements selected in step S4 (step S5-1)

In the present embodiment, assuming that two patterns Pj' and Pj" may be expressed by the following equation 12 and 13, respectively (step S5-2):

$$Pj'=(X1', X2', X3', X4', X5') \quad (12)$$

$$Pj"=(X1", X2", X3", X4", X5") \quad (13)$$

For each of patterns Pj' and Pj", another random number F may be generated in the range of $1 \leq F \leq 4$ (={number of layers}-1), then based on this random number F the locations between the elements at which two patterns are to be crossed over are determined (step S5-3).

In the present embodiment, assuming F=3, then the locations between the elements at which two patterns Pj' and Pj" are to be crossed over may be expressed as shown in equation 14 below:

$$Pj' = (X1', X2', X3', \;|\; X4', X5') \quad (14)$$
$$\times$$
$$Pj" = (X1", X2", X3", \;|\; X4", X5")$$

Crossing over point

Two patterns are crossed over at that locations between elements so as to generate newly combined two patterns Ck and Ck+1 as expressed in equations 16 and 17 below (steps S5-4 and S5-5):

$$Ck=(X1', X2', X3', X4", X5") \quad (16)$$

$$Ck+1=(X1", X2", X3", X4', X5') \quad (17)$$

Then, the operation in the steps S5-1 through S5-5 will be repeated until the number of whole pattern groups will become equal to the predetermined total number of patterns after cross-over process step (cross-over step S5).

In the present embodiment, as the total number of patterns after cross-over step is 20, and as the total number of patterns before cross-over step is 10, the operation of the steps S5-1 through S5-5 will be repeated until C10 will have been generated (step S5-6).

Figure 8:
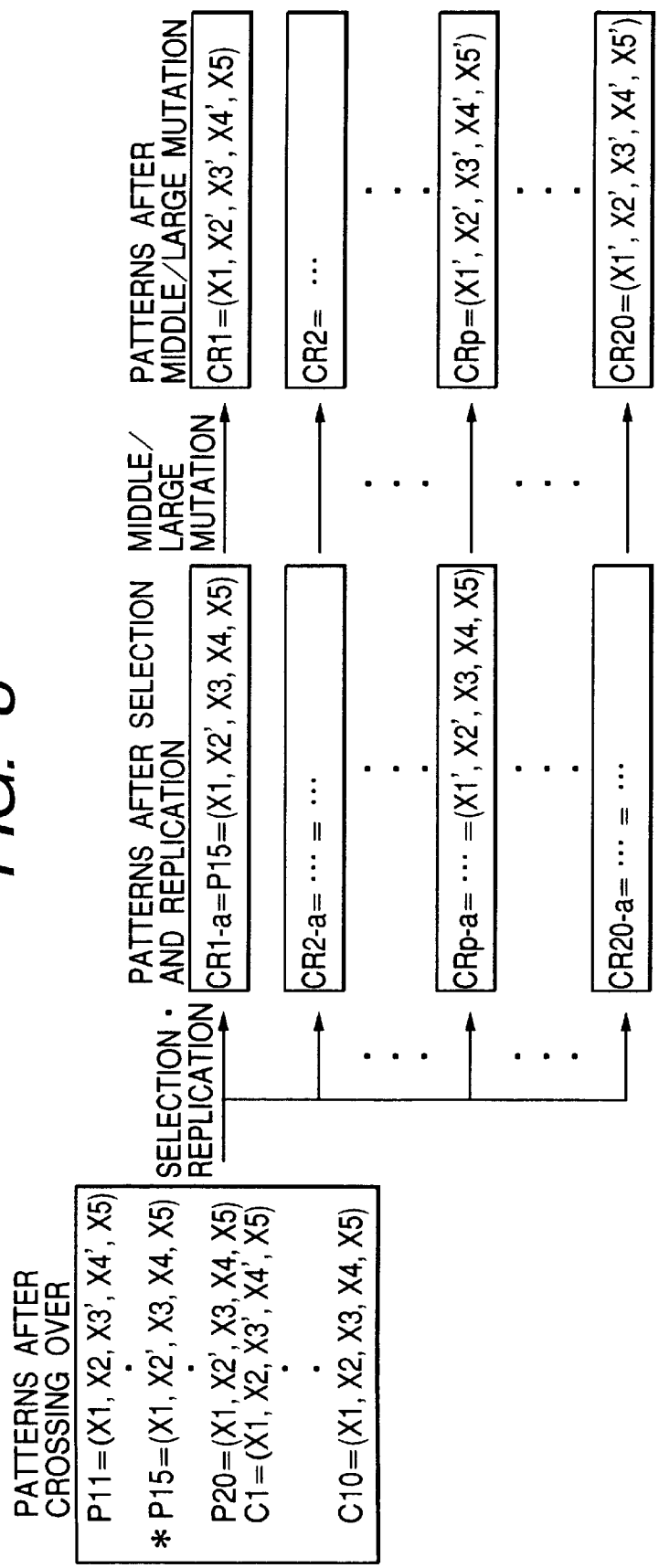
FIG. 8 shows a schematic diagram illustrating selection, reproduction, and middle/large-scaled mutation process in the flowchart shown in FIG. 2.

In step S6 as shown in FIG. 2, a middle/large-scaled mutation is applied to the patterns Pj and Ck after cross-over to generate a new pattern CRp (shown in FIG. 8).

However, for the selection between middle- and large-scaled mutation in step S6, a random number G in the range of $0 \leq G \leq 1$ at the completion of cross-over process step is generated, and middle-scaled mutation will be applied if the random number G is less than 0.8, or large mutation will be applied if G is 0.8 or more.

In step S6, a random number H is generated in the range of $0 \leq H \leq (j+k)$, then based on this random number H one pattern is picked up from within the patterns Pj and Ck after cross-over and thus selected pattern is duplicated to generate a new pattern CRp-a. The operation of selecting and duplicating a pattern will be repeated until the total number of pattern groups will have become equal to 40, the total number of patterns after middle/large-scaled mutation process step. The selection and replication process will generate CR1-a through CR20-a. Thereafter, by applying a middle/large-scaled mutation to the CRp-a, patterns CRp having middle/large-scaled mutation applied will be generated (selection, reproduction, middle/large-scaled mutation process step S6).

Figure 9:
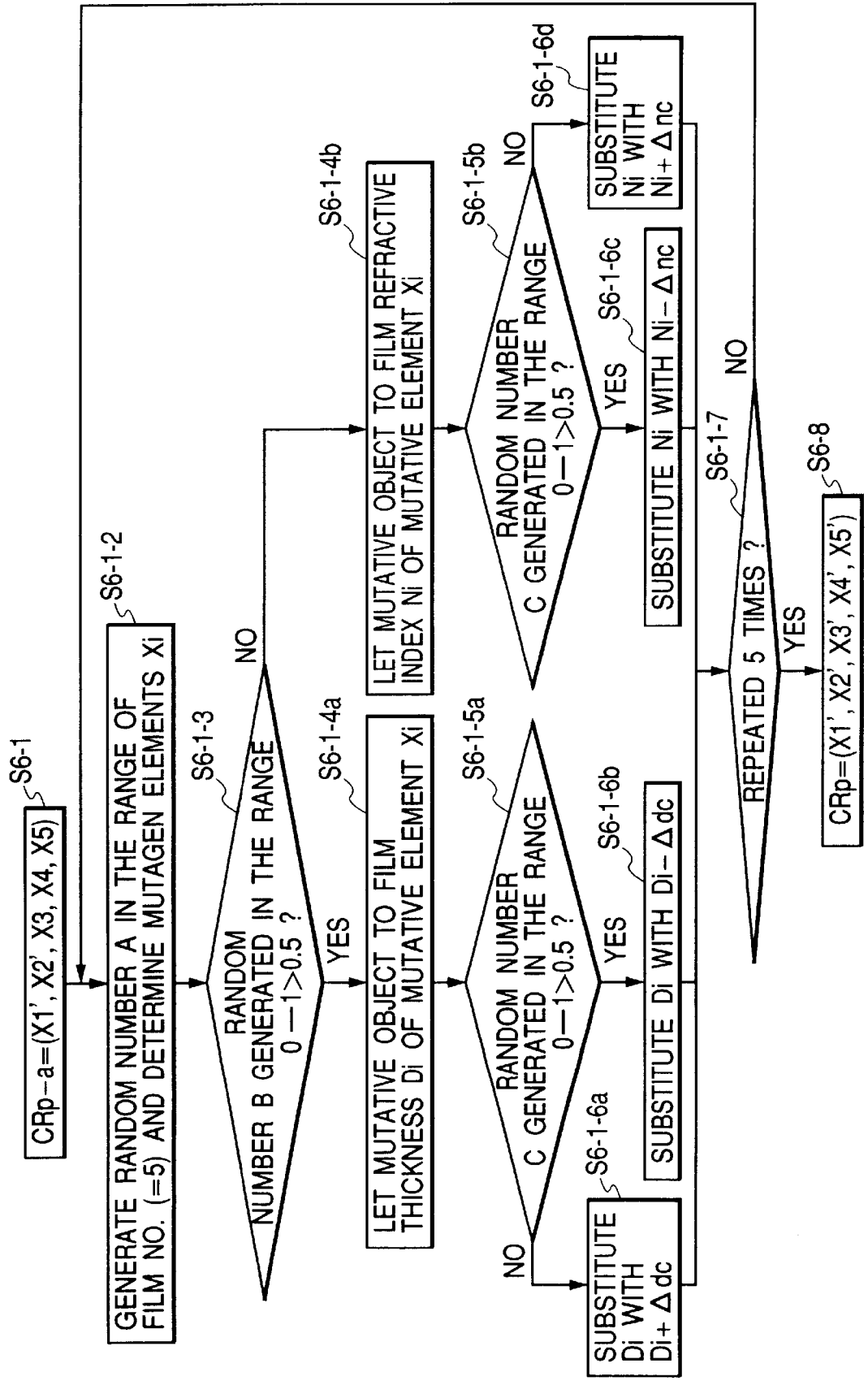
FIG. 9 shows a flowchart illustrating middle-scaled mutation in the flowchart shown in FIG. 2.

Now the process of middle-scaled mutation will be described below in greater details. As shown in FIG. 9, in the middle-scaled mutation step, a random number A is generated in the range of $1 \leq A \leq 5$ (=number of layers) and thereby one element Xi={(Ni, Di)} in the patterns CRp-a will be selected (step S6-1-2) Then another random number B will be generated in the range of $0 \leq B \leq 1$ (step S6-1-3), and Di will be selected if the random number B is 0.5 or more (step S6-1-4a), or Ni will be selected if the random number B is less than 0.5 (step S6-1-4b). Thereafter still another random number C will be generated in the range of $0 \leq C \leq 1$ (steps S6-1-5a, S6-1-5b), then + is selected if the random number C is less than 0.5 (steps S6-1-6a, S6-1-6d), will be selected if C is equal to or more than 0.5 (steps S6-1-6b, S6-1-6c). By the above operation, middle-scaled mutation of either positive or negative (+ or −Δnc, or + or −Δdc) will be performed on Ni or Di. The operation from S6-1-2 to S6-1-6a, 6b, 6c, and 6dwill be repeated a predetermined number of times Nc (=5) (step S6-1-7) to generate patterns CRp having middle-scaled mutation applied (step S6-8).

Figure 10:
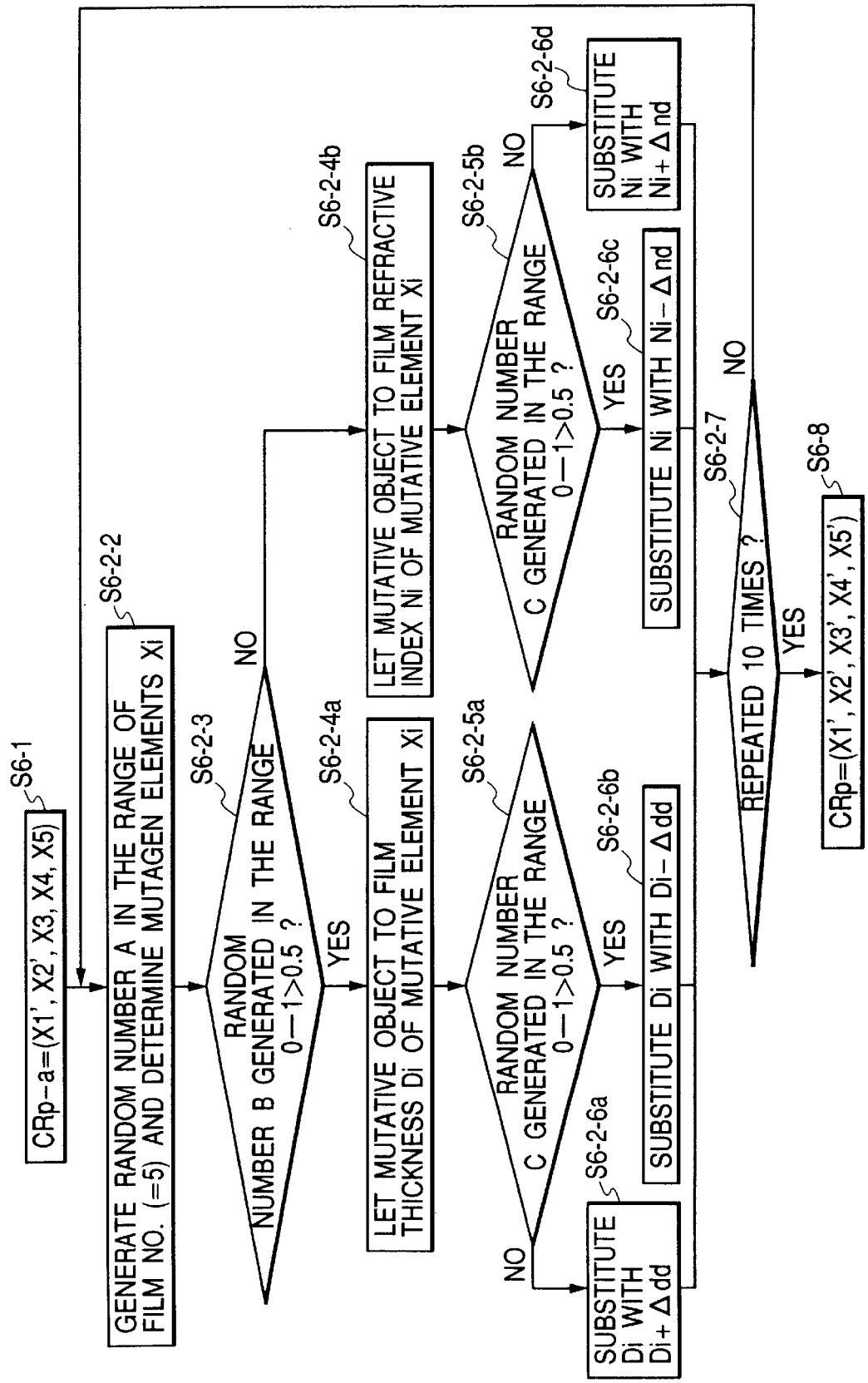
FIG. 10 shows a flowchart illustrating large-scaled mutation in the flowchart shown in FIG. 2.

Now the process of large-scaled mutation will be described below in greater details (shown in FIG. 10). In the large-scaled mutation process, a random number A is generated in the range of $1 \leq A \leq 5$ (=number of layers) and thereby one element Xi={(Ni, Di)} in the patterns CRp-a will be selected (step S6-2-2). Then another random number B will be generated in the range of $0 \leq B \leq 1$ (step S6-2-3), and Di will be selected if the random number B is 0.5 or more (step S6-2-4a), or Ni will be selected if the random number B is less than 0.5 (step S6-2-4b). Thereafter still another random number C will be generated in the range of $0 \leq C \leq 1$ (steps S6-2-5a, S6-2-5b), then + is selected if the random number C is less than 0.5 (steps S6-2-6a, S6-2-6d), will be selected if C is equal to or more than 0.5 (steps S6-2-6b, S6-2-6c). By the above operation, large-scaled mutation of either positive or negative (+ or −Δnd, or + or −Δdd) will be performed on Ni or Di. The operation from S6-2-2 to S6-2-6a, 6b, 6c, 6d will be repeated a predetermined number of times Nc (=10) (step S6-2-7) to generate patterns CRp having large-scaled mutation applied (step S6-8).

By applying the middle/large-scaled mutation process steps as above, pattern group of combination of elements having completely different element patterns may be incorporated into the pattern groups.

After the selection, reproduction, and middle/large-scaled mutation process step in step S6 has been completed, then in step S7 the optical characteristics of the patterns Pj, Ck, and CRp having passed through step S6 are calculated so as to determine the difference in optical characteristics from the desired value. The optical characteristics refers to as the reflection characteristics of the multilayered optical filter with respect to the incident light incident to the filter at the incident angle θ, in a manner similar to step S3.

In accordance with the method as described above, the fitness Qm for each pattern (where $1 \leq m \leq j+k+p$) may be determined.

Figure 11:
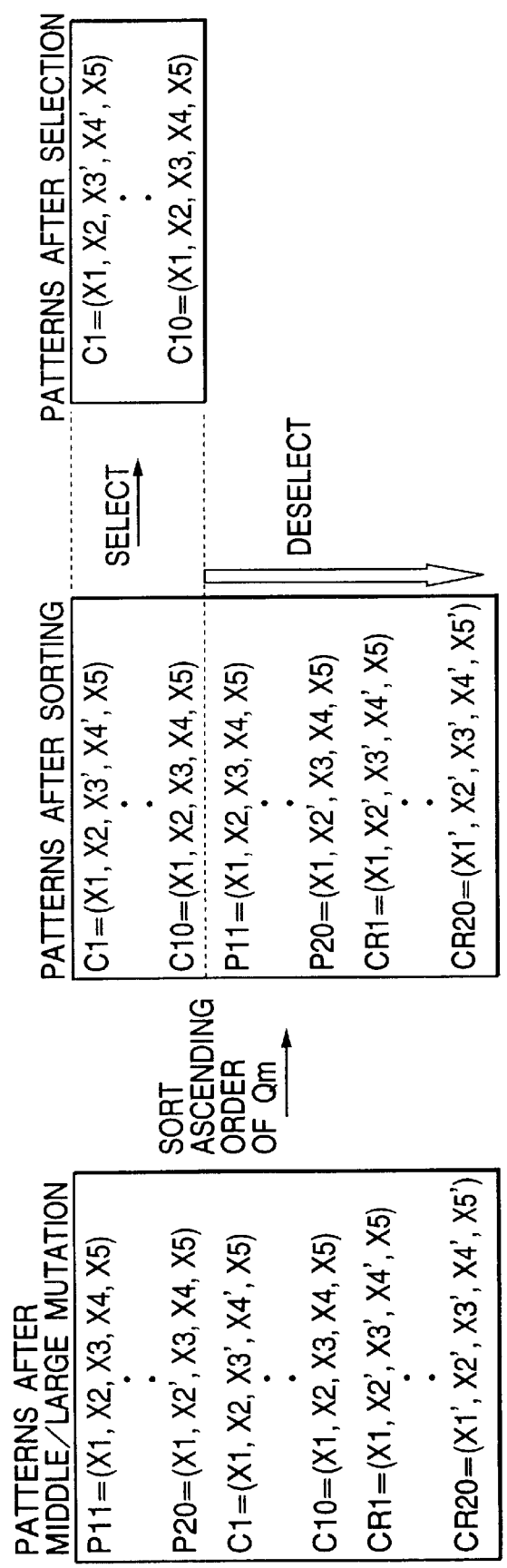
FIG. 11 shows a schematic diagram illustrating second selection process in the flowchart shown in FIG. 2.

Next, in step S8, the patterns of combination of elements are selected based on the fitness Qm for the patterns Pj, Ck, CRp of combination of elements, determined in the step S7 with respect to the desired optical characteristics (shown in FIG. 11). To do this, patterns Pj, Ck, CRp are sorted in the order of Qm from the highest to the lowest, then the sorted patterns are picked up from the highest by the number corresponding to the total number of patterns after selection. Patterns other than those picked up are deselected to reject (secondary selection step S8).

In the present embodiment, if the patterns are in the order as shown in the following equation (18), by sorting on the fitness Qm:

$$C1, \ldots C10, P11, \ldots, P20, CR1, \ldots, CR20 \quad (18)$$

since the number of individuals after selection is 10, the patterns of combination of elements extracted by the foregoing operation will be C1 through C10.

Above steps S1 through S8 may be the first generation. When step S8 has been completed, the pattern of combination of elements having the highest Qm is referred to as the best pattern of combination in that generation. In the present embodiment, C1 may be the best pattern of combination in the first generation.

Once the first generation has been completed, the operation in steps S2 through S8 are repeated for the pattern group of combination of 10 elements obtained in the preceding step S8, until the best result of fitness Qm of the pattern of combination in respective generation becomes equal to or more than the predetermined value Q0 (step S9).

The pattern of combination of elements having the best fitness Qm obtained from the repetition of the foregoing steps may be used for the designing parameter of the multilayered optical filter.

Second Embodiment

Now another preferred embodiment of the present invention will be described below in greater details. In the second preferred embodiment, the calculation of optimization for a multilayered optical filter of 5 layers will be described, by way of example, as similar to that shown in FIG. 1.

In the second preferred embodiment in accordance with the present invention, the optical characteristics of the selected pattern obtained in the algorithmic process steps of a given generation may be compared with the optical characteristics of the selected pattern obtained in the algorithmic process steps of an ancestor generation. If those two patterns are matched, a second initial pattern will be set, which may be different from the initial-pattern used in the preceding algorithmic process steps. By using this second initial pattern the algorithmic process steps will be repeated once again. In the following description the process steps using the second initial pattern will be primarily described and the description of the steps identical to the first preferred embodiment will be omitted.

Figure 14:
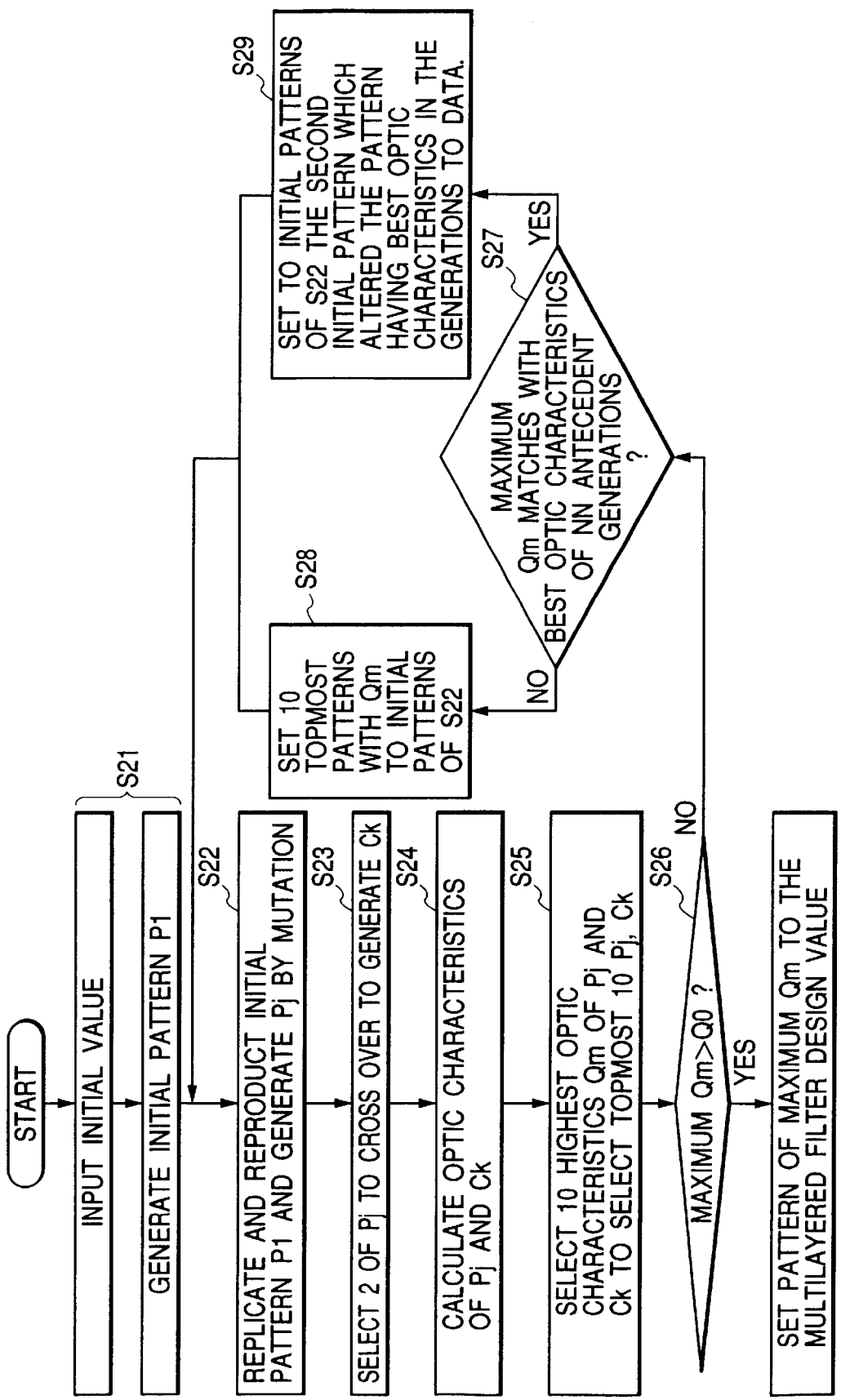
FIG. 14 shows a flowchart illustrating second preferred embodiment in accordance with the present invention.

FIG. 14 shows a flowchart of designing a multilayered optical filter having the structure of five layers in accordance with the second preferred embodiment of the present invention.

In the second preferred embodiment, random number α(=A, B, C, D, E, F) may be used in the operations of selection, extraction, deselection, cross-over, and mutation designated in steps S21 through S29. The random number α may be generated by the congruence, as similar to the preceding first preferred embodiment.

In step S21, the initial values required for calculation (desired optical characteristics; total number of film layers; refractive index of the substrate; incident angle of the incident light; total number of patterns after the reproduction and mutation process step; amount of mutation; number of repetition of mutation step; total number of patterns after cross-over step; total number of patterns after the selection step; number of generations to be compared, amount of mutation in the second initial pattern generating step; total number of repetition of mutation step in the second initial pattern generating step; target value of the fitness) or the range of numbers are specified.

Then as similar to first preferred embodiment, the matrix Xi={Ni, Di} comprising the refractive index Ni and thickness Di as elements in the layer i of the multilayered film j may be used for generating a initial pattern Pj as shown in the following equation (6) (step of generating initial pattern group):

$$Pj=(X1, X2, \ldots, Xi, \ldots) \tag{6}$$

In the second preferred embodiment, initial values required for the calculation in step S21 maybe those shown in Table 2 below. A pattern P1 of combination of elements as expressed in the following expression (7) may be generated by the operation as described above:

$$P1=(X1, X2, X3, X4, X5) \tag{7}$$

TABLE 2

| Number of initial patterns | | 1 |
|---|---|---|
| Reproduction/ mutation step | Total number of patterns after step | 20 |
| | Amount of mutation | Δn, Δd |
| | Number of repetition in mutation step | Nh |
| Selection and cross-over step | Total number of patterns after step | 30 |
| Selection step | Total number of patterns after step | 10 |
| Number of compared generations | | NN generations earlier |
| Second initial pattern generating step | Total number of patterns after step | 1 |
| | Amount of mutation | Δnss, Δdss |
| | Number of repetition | Nss |
| Target value of fitness | | Q0 |

Next, in step S22, the initial pattern is replicated to increase the total number of pattern group up to the number of patterns after the reproduction step (shown in FIG. 15).

In the present embodiment, total number of pattern groups after this operation will be P1 through P20, patterns being expressed as the following equation (8):

$$P1=P2=P3= \ldots =P20 \tag{8}$$

Figure 16:
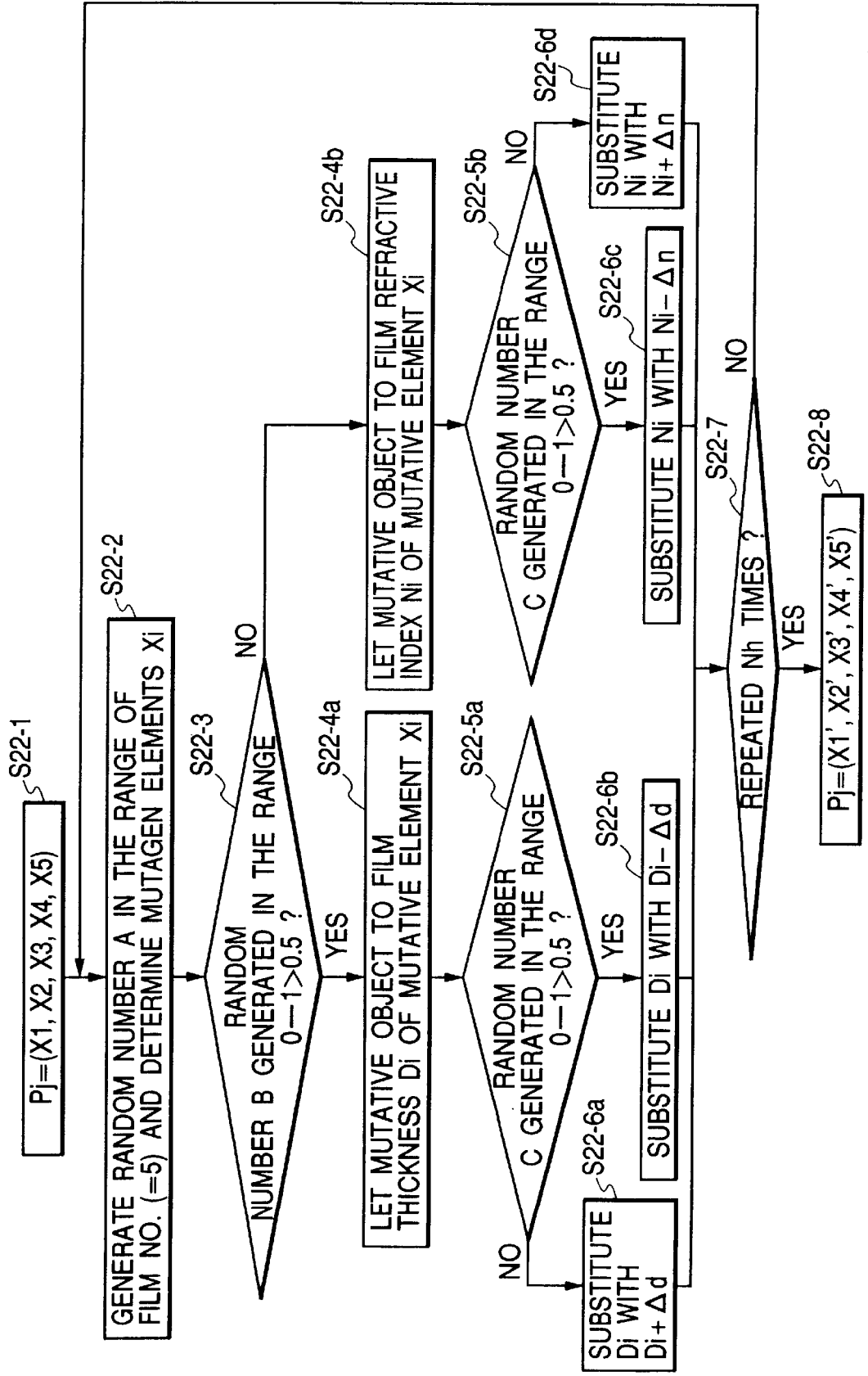
FIG. 16 shows a flowchart illustrating mutation process in the flowchart shown in FIG. 14.

Then, mutation is performed on each of the replicated patterns P2 through P20 (as shown in FIG. 16). A random number A is generated in the range of $1 \leq A \leq 5$ (=number of layers), and by using this random number one element Xi={(Ni, Di)} in the patterns is selected (step S22-2). Then, another random number B is generated in the range $0 \leq B \leq 1$ (step S22-3), and Di will be selected if the random number B is equal to or more than 0.5 (step S22-4a), Ni will be selected if B is less than 0.5 (step S22-4b). Then, still another random number C is generated in the range of $0 \leq C \leq 1$ (steps S22-5a, S22-5b), and + is selected if the random number C is less than 0.5 (steps S22-6a, S22-6d),— will be selected if C is equal to or more than 0.5 (steps S22-6b, S22-6c). A mutation of either positive or negative (+ or −Δn, or + or −Δd) is performed on Ni or Di by the above operation. The operation from S22-2 to S22-6a, 6b, 6c, and 6d will be repeated a predetermined number of times Nh (step S22-2-7) to generate patterns Pj having mutation applied (step S22-8) (reproduction and mutation step: S22).

In the present embodiment, assuming that random numbers are A=3, B=0.2, C=0.6 and Nh=1 with respect to the replicated pattern P2, then the P2 by the operation above maybe expressed as the following equation (9) below:

$$P2=(X1, X2, X3', X4, X5)=\{X1, X2, (N3+\Delta n, D3), X4, X5\} \tag{9}$$

Figure 18:
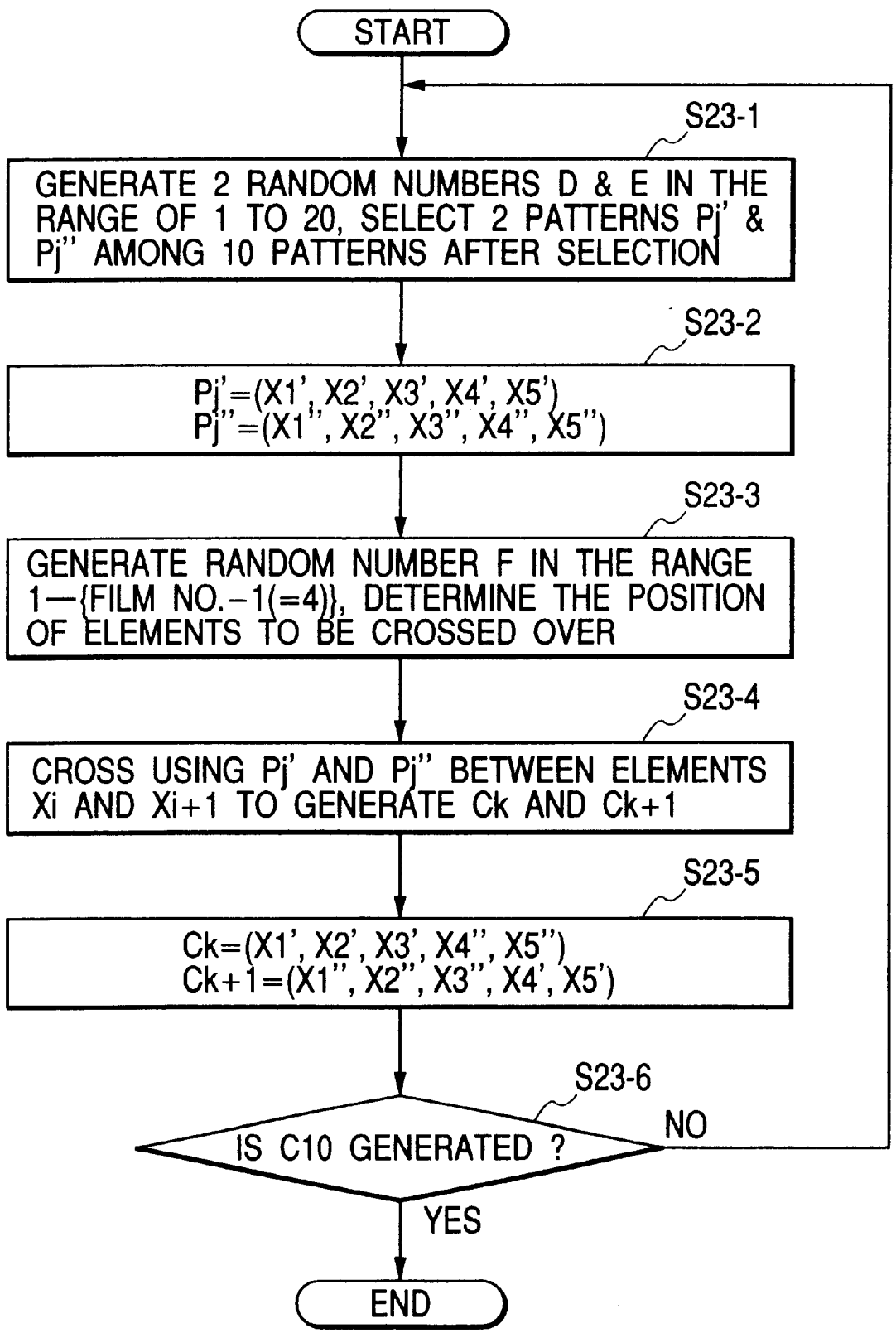
FIG. 18 shows a flowchart illustrating cross-over process in the flowchart shown in FIG. 14.

Then, as shown by step S23 in FIG. 14, patterns are crossed over (shown in FIG. 17 and FIG. 18). FIG. 17 shows the generation of patterns in one cross over step, while FIG. 18 shows a flowchart of cross over step including repetition. Here two random numbers D and E are generated in the range $1 \leq D$, $E \leq 20$ (=total number of patterns after reproduction/selection), then based on these random numbers D and E two patterns Pj' and Pj" (where $1 \leq j'$, $j" \leq j$) are picked up from among pattern groups P1 through P20 generated in step S22 or earlier (step S23-1).

In the present embodiment, two patterns Pj' and Pj" may be expressed by the following equations 12 and 13, respectively (step S23-2):

$$Pj'=(X1', X2', X3', X4', X5') \tag{12}$$

$$Pj"=(X1", X2", X3", X4", X5") \tag{13}$$

For each of patterns Pj' and Pj", another random number F may be generated in the range of $1 \leq F \leq 4$ (={number of layers}−1), then based on this random number F the locations between the elements at which two patterns are to be crossed over are.determined (step S23-3).

In the present embodiment, assuming F=3, then the locations between the elements at which two patterns Pj' and Pj" are to be crossed over may be expressed as shown in equation 14 below:

$$Pj' = (X1', X2', X3', \ | \ X4', X5') \tag{14}$$
$$\times$$
$$Pj" = (X1", X2", X3", \ | \ X4", X5")$$

Crossing over point

Two patterns are crossed over at that locations between elements so as to generate newly combined two patterns Ck and Ck+1 as expressed in equations 16 and 17 below (steps S23-4 and S23-5):

$$Ck=(X1', X2', X3', X4", X5") \tag{16}$$

$$Ck+1=(X1", X2", X3", X4', X5') \tag{17}$$

Then, the operation in the steps S23-1 through S23-5 will be repeated until the number of whole pattern groups will become equal to the predetermined total number of patterns after cross-over process step (cross-over step S23).

In the present embodiment, the total number of patterns after cross-over step is 30, and the total number of patterns before cross-over step is 20, therefore the operation of the steps S23-1 through S23-5 will be repeated until C10 will have been generated (step S23-6).

After the cross-over process in step S23 has been completed, in step S24, the optical characteristics of the patterns Pj, and Ck having passed through step S23 are calculated so as to determine the difference in optical characteristics from the desired value. The optical characteristics refers to as the reflection characteristics of the multilayered optical filter with respect to the incident light incident to the filter at the incident angle θ, in a manner similar to first preferred embodiment.

In accordance with the method as described above, the fitness Qm for each pattern (where $1 \leq m \leq j+k$) may be determined.

Figure 19:
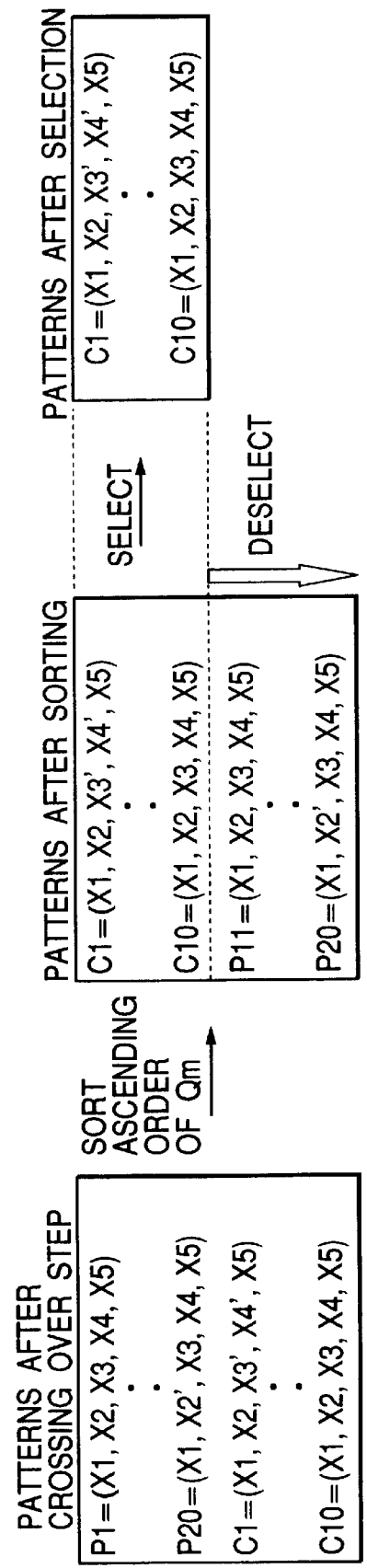
FIG. 19 shows a schematic diagram illustrating selection process in the flowchart shown in FIG. 14.

Next, in step S25, the patterns of combination of elements are selected based on the fitness Qm for the patterns Pj, and Ck of combination of elements, determined in step S24 with respect to the desired optical characteristics (shown in FIG. 19). To do this, patterns Pj, and Ck are sorted in the order of Qm from the highest to the lowest, then the sorted patterns are picked up from the highest by the number corresponding to the total number of patterns after selection. Patterns other than those picked up are deselected to reject (selection step S25) In the present embodiment, if the patterns are in the order as shown in the following equation (19), by sorting on the fitness Qm:

$$C1, \ldots, P1, \ldots, P20 \qquad (19)$$

since the number of individuals after selection is 10 the patterns of combination of elements extracted by the foregoing operation will be C1 through C10.

Above steps S21 through S25 may be the first generation. When step S25 has been completed, the pattern of combination of elements having the highest Qm is referred to as the best pattern of combination in that generation. In the present embodiment, C1 may be the best pattern of combination in the first generation.

After the first generation has been completed, it may be determined whether or not the best fitness Qm will be equal to or more than the predetermined value, Q0, with respect to the pattern group of combination of 10 elements obtained in step S25 (step S26). If the best fitness value Qm of the combination pattern becomes the predetermined value Q0 or more, then the pattern of combination of elements having the best fitness Qm may be used for the designing parameter of the multilayered optical filter.

If, on the other hand, the best fitness Qm of the combination pattern is not equal to or more than the predetermined Q0, then the local convergence of thus obtained combination pattern should be determined (step S27). In step S27, the best fitness Qm of the combination pattern is determined whether or not to match with the best fitness in the combination patterns obtained from the current or preceding NN generations. Or the best fitness Qm of the combination pattern is determined whether to be the same in NN generations to the current generation.

If the best fitness Qm of the combination pattern is not matched with the best fitness in the combination pattern obtained from the NN generations preceding to the current generation, it will be determined that there is a local convergence, and the pattern group of combination of 10 elements obtained in step S25 will be the initial pattern of step S22 in the next generation (step S28).

If matched, it will be determined that there is a local convergence, and second initial pattern will be generated (step S29).

Figure 20:
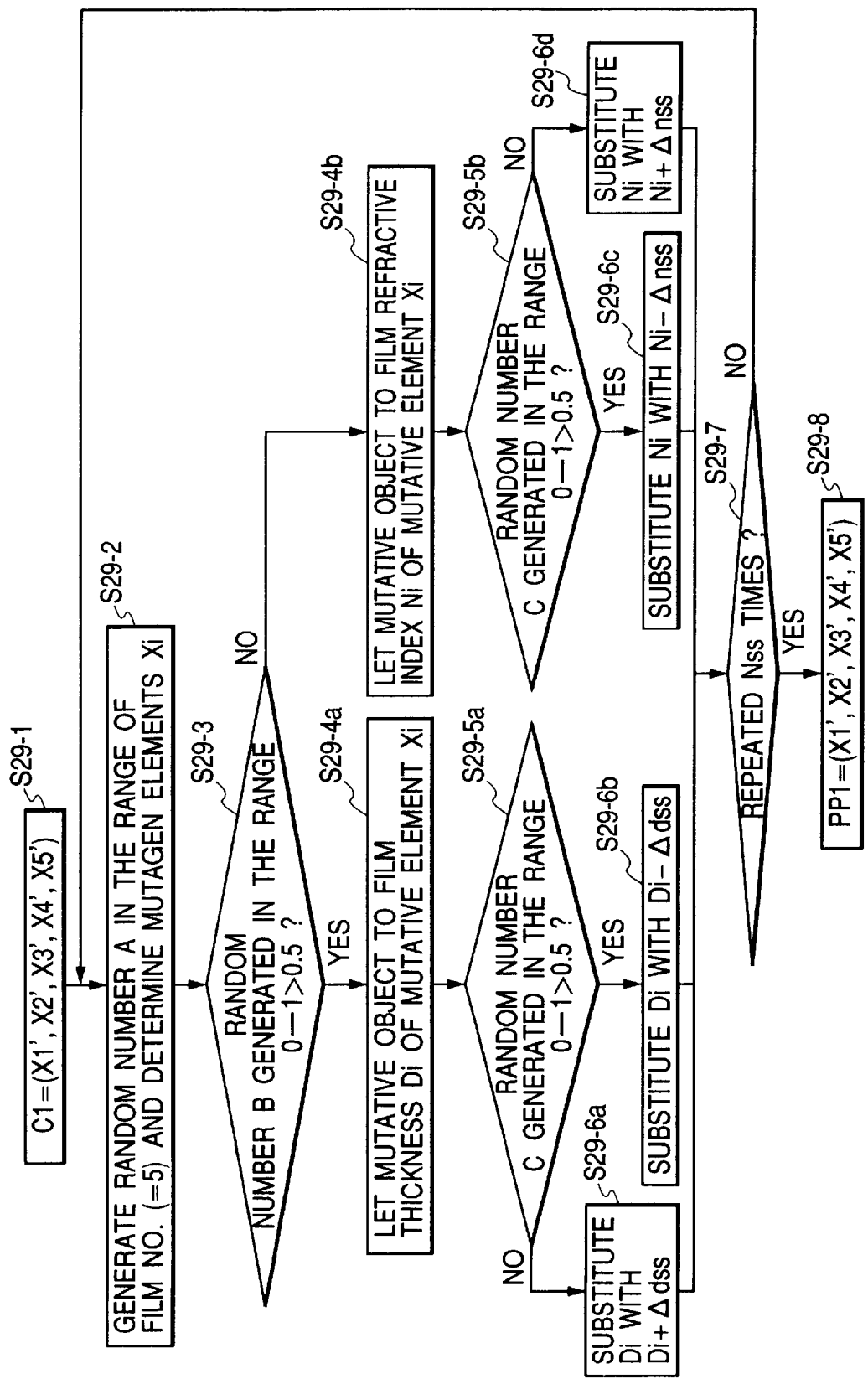
FIG. 20 shows a flowchart illustrating second initial pattern generation process in the flowchart shown in FIG. 14.

Second initial pattern may be generated by mutating the combination pattern of elements having the best fitness in the combination pattern of elements obtained between the first generation and the generation that matched (shown in FIG. 20). A random number A is generated in the range of $1 \leq A \leq 5$ (=number of layers), and by using this random number A one element $Xi=\{(Ni, Di)\}$ in the patterns with the best fitness is selected (step S29-2). Then , another random number B is generated in the range $0 \leq B \leq 1$ (step S29-3), and Di will be selected if the random number B is equal to or more than 0.5 (step S29-4a), Ni will be selected if B is less than 0.5 (step S29-4b). Then, still another random number C is generated in the range of $0 \leq C \leq 1$ (steps S29-5a, S29-5b), and + is selected if the random number C is less than 0.5 (steps S29-6a, S29-6d),—will be selected if the random number C is equal to or more than 0.5 (steps S29-6b, S29-6c). A middle-scaled mutation of either positive or negative (+ or $-\Delta nss$, or + or $-\Delta dss$) is performed on Ni or Di by the above operation. The operation from S29-2 to S29-6a, 6b, 6c, and 6d will be repeated a predetermined number of times Nss (step S29-7) to generate second initial patterns PP1 having middle-scaled mutation applied (step S29-8). This second initial pattern PP1 may be used as the initial pattern for step S22 in the next generation to perform the operation in the step S22 and later.

Now in the present embodiment, the optical characteristics of the best combination pattern of elements in a given generation are assumed to be matched with the optical characteristics of the pattern obtained in the selection step of the algorithm in the 10th generation earlier. If the combination pattern of elements having the best optical characteristics in generations earlier to the matched generation is C1 $\{=(X1', X2', X3', X4', X5')\}$, and if in step S29 the random number A=4, B=0.2, C=0.6, and Nh=1, then second initial pattern PP1 may be expressed, based on the foregoing operation, as following equation (20):

$$PP1=\{X1', X2', X3', (N4+\Delta n, D4), X5'\} \qquad (20)$$

The operation in step S22 through S29 will be repeated until the best fitness Qm of the combination pattern of each of generations will become equal to or more than the predetermined value Q0.

The pattern of combination of elements having the best fitness Qm obtained from the repetition of the foregoing process steps may be used for the designing parameter of the multilayered optical filter.

In first preferred embodiment, steps S27 through S29 in the second preferred embodiment of the present invention, i.e., steps for determining the local convergence of the patterns having passed through step S26 was not featured but these steps may be incorporated into the first preferred embodiment of the present invention.

Also in first preferred embodiment, the reproduction and mutation step and selection step are performed twice, however, the first selection step and second reproduction and mutation step may be omitted as similar to second preferred embodiment of the present invention.

Although the conventional optimization method of thickness of multilayered optical filters has small degree of freedom of design, and may obtain only multilayered structure having optical characteristics different from the desired optical characteristics, the method disclosed as first and second preferred embodiment of the present invention, in contrast, may obtain a multilayered structure more optimal to the desired optical characteristics.

EXAMPLES

Some examples carrying out the present invention will be described below in greater details with reference to the accompanying tables and drawings.

Now examples using the algorithm consisted of the steps of initial pattern generation, first reproduction and mutation, first selection, cross-over, second reproduction and mutation, and second selection (examples 1 and 2) will be described. Thereafter another example will be described, in which the optical characteristics obtained in a given algorithmic process is compared with the optical characteristics of selection pattern obtained in the earlier turns preceding to the given algorithmic process, and if matched, a second initial pattern different from the initial pattern used in the algorithmic process may be established and used to repeat the algorithmic process (example 3).

For the initial values of the multilayered structure used in the examples hereinbelow, multiple layers are alternated by higher refractive layers with lower refractive layers; thickness of each layer is set to λ/4 optical multilayered film having the mean reflection wavelength at 550 nanometers (nm). The target optical characteristics comprise the reflectance of 0.1 from 200 to 450 nm and from 650 to 1000 nm, and of 0.5 from 450 to 650 nm.

Example 1

In this example there will be shown the result of optimization on a multilayered film of 5 layers. The initial values of the multilayered film of 5 layers used in this example will be listed in Table 3 below. Other parameters for the optimization by the method disclosed herein will be listed in Table 4 below.

TABLE 3

|  | Refractive index | Film thickness |
| --- | --- | --- |
| $1^{st}$ layer | 2.3 | 60 nm |
| $2^{nd}$ layer | 1.5 | 94 nm |
| $3^{rd}$ layer | 2.3 | 60 nm |
| $4^{th}$ layer | 1.5 | 94 nm |
| $5^{th}$ layer | 2.3 | 60 nm |

TABLE 4

| Number of initial patterns | | | 1 |
| --- | --- | --- | --- |
| Reproduction and small-scaled mutation step | Total number of patterns after step | | 20 |
| | Amount of small-scaled mutation | Δnz | 0.1 |
| | | Δdz | 1 nm |
| First selection step | Total number of patterns after step | | 10 |
| Selection and cross-over step | Total number of patterns after step | | 20 |
| Second initial pattern generating step | Total number of patterns after step | | 40 |
| | Amount of middle-scaled mutation | Δnc | 0.5 |
| | | Δdc | 5 nm |
| | Number of repetitions in middle-scaled mutation | Nc | 5 |
| | Amount of large-scaled mutation | Δnd | 1.0 |
| | | Δdd | 25 nm |
| | Number of repetitions in large-scaled mutation | Nd | 10 |
| Second selection step | Total number of patterns after step | | 10 |
| Target value of fitness | | Q0 | 0.6 |

Although in the thickness optimization method the reflection peak intensity may reach to the target value, large reflection subband appears. In addition maximum fitness Q by the thickness optimizationmethodwas 0.1618. The multilayered structure of 5 layers optimized by the thickness optimization method will be shown in Table 5 below:

TABLE 5

|  | Refractive index | Film thickness |
| --- | --- | --- |
| $1^{st}$ layer | 2.3 | 54.5 nm |
| $2^{nd}$ layer | 1.5 | 89.4 nm |
| $3^{rd}$ layer | 2.3 | 72.3 nm |
| $4^{th}$ layer | 1.5 | 11.5 nm |
| $5^{th}$ layer | 2.3 | 97.5 nm |

When calculating in accordance with the method of the present invention with the parameters shown in Table 4 above, on the other hand, the best fitness Q became 0.6090 at 49th generation, which was larger than Q0. This fitness Q is larger than the fitness obtained by the thickness optimization method, it can be concluded that the present method may obtain a multilayered structure having optical characteristics much closer to the target characteristics than the thickness optimization method.

Figure 12:
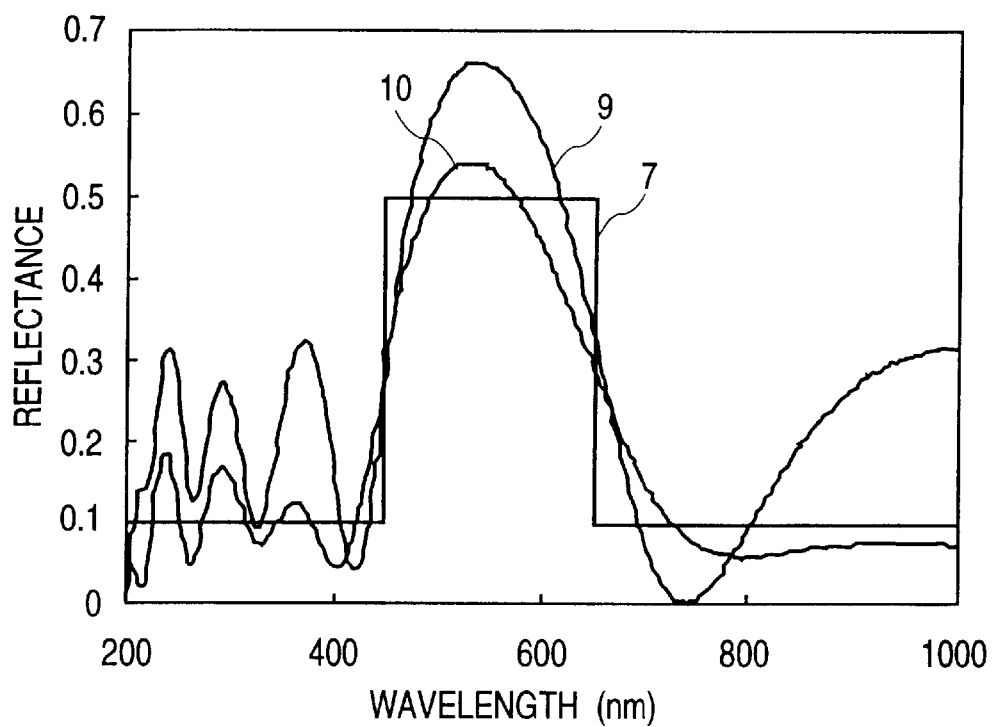
FIG. 12 shows a graph illustrating reflectance of the best result of optimization of a multilayered optic filter having five layers produced in accordance with first example of the present invention.

FIG. 12 shows optical characteristics 10 of the optical multilayered structure having the best fitness Q. For the purpose of comparison the result 9 in the thickness optimization method and the target optical characteristics 7 are also shown.

Referring now to FIG. 12, it can be obviously appreciated that the present method may obtain a multilayered structure having smaller reflection subband and optical characteristics closer to the target characteristics than the thickness optimization method. Table 6 shows the multilayered structure with five layers optimized in accordance with the method of the present invention.

TABLE 6

|  | Refractive index | Film thickness |
| --- | --- | --- |
| $1^{st}$ layer | 1.9 | 65 nm |
| $2^{nd}$ layer | 1.7 | 77 nm |
| $3^{rd}$ layer | 2.3 | 60 nm |
| $4^{th}$ layer | 1.7 | 82 nm |
| $5^{th}$ layer | 2.1 | 60 nm |

Example 2

In this example there will be shown the result of optimization on a multilayered structure of 15 layers. The initial values of the multilayered film of 15 layers used in this example will be listed in Table 7 below. Other parameters for the optimization by the method disclosed herein will be listed in Table 4 above.

TABLE 7

|  | Refractive index | Film thickness |
| --- | --- | --- |
| $1^{st}$ layer | 2.3 | 60 nm |
| $2^{nd}$ layer | 1.5 | 94 nm |
| $3^{rd}$ layer | 2.3 | 60 nm |
| $4^{th}$ layer | 1.5 | 94 nm |
| $5^{th}$ layer | 2.3 | 60 nm |
| $6^{th}$ layer | 1.5 | 94 nm |
| $7^{th}$ layer | 2.3 | 60 nm |
| $8^{th}$ layer | 1.5 | 94 nm |
| $9^{th}$ layer | 2.3 | 60 nm |
| $10^{th}$ layer | 1.5 | 94 nm |
| $11^{th}$ layer | 2.3 | 60 nm |
| $12^{th}$ layer | 1.5 | 94 nm |
| $13^{th}$ layer | 2.3 | 60 nm |
| $14^{th}$ layer | 1.5 | 94 nm |
| $15^{th}$ layer | 2.3 | 60 nm |

Figure 13:
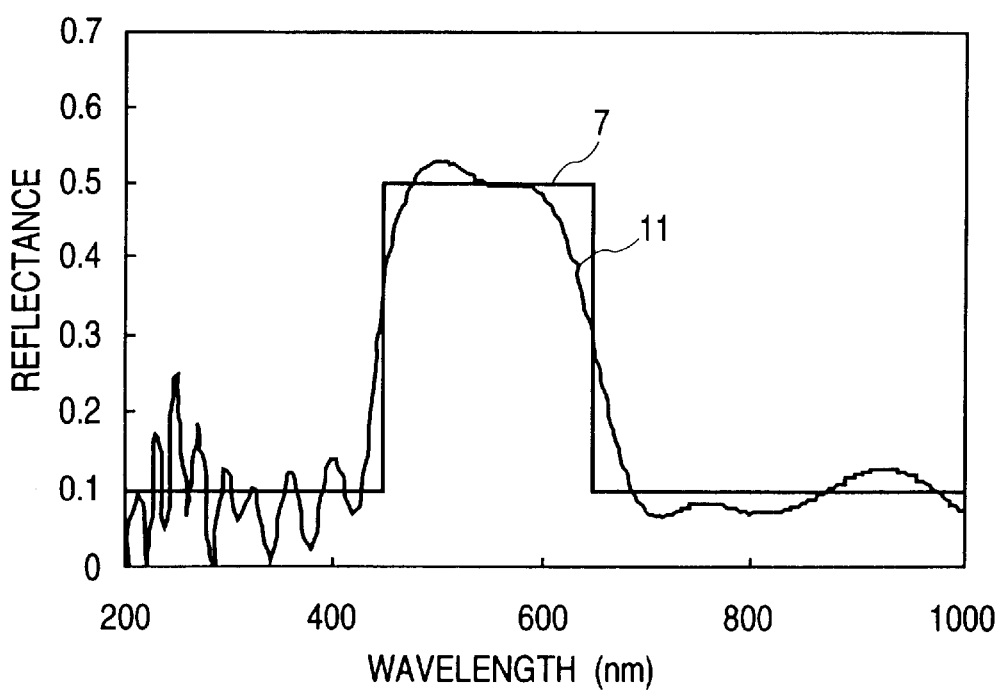
FIG. 13 shows a graph illustrating reflectance of the best result of optimization of a multilayered optic filter having fifteen layers produced in accordance with second example of the present invention.

FIG. 13 shows optical characteristics 11 of the optical multilayered structure having the best fitness Q for 15 layers when optimizing in accordance with the method of the present invention with the parameters shown in Table 4 above. Referring to FIG. 13, it can be concluded that the method in accordance with the present invention may be applied to the multilayered structure having more layers, as well as a multilayered optical filter may be obtained, which has optical characteristics much closer to the desired optical characteristics by increasing the number of layers. Table 8 shows the multilayered structure of 15 layers optimized in accordance with the method of the present invention.

As can be seen from the foregoing discussion, in accordance with the method disclosed in the present invention, a multilayered optical filter having the desired optical characteristics may be readily obtained.

TABLE 8

|  | Refractive index | Film thickness |
| --- | --- | --- |
| 1st layer | 1.9 | 45 nm |
| 2nd layer | 1.9 | 74 nm |
| 3rd layer | 1.9 | 50 nm |
| 4th layer | 1.7 | 79 nm |
| 5th layer | 1.7 | 50 nm |
| 6th layer | 1.5 | 99 nm |
| 7th layer | 2.1 | 65 nm |
| 8th layer | 1.5 | 94 nm |
| 9th layer | 2.1 | 60 nm |
| 10th layer | 1.5 | 94 nm |
| 11th layer | 1.9 | 50 nm |
| 12th layer | 1.7 | 74 nm |
| 13th layer | 1.9 | 60 nm |
| 14th layer | 1.5 | 74 nm |
| 15th layer | 1.5 | 10 nm |

Example 3

In this example there will be shown the result of optimization on a multilayered structure of 3 layers. The initial values of the multilayered film of 3 layers used in this example will be listed in Table 9 below. Other parameters for the optimization by the method disclosed herein will be listed in Table 10 below.

TABLE 9

|  | Refractive index | Film thickness |
| --- | --- | --- |
| 1st layer | 2.3 | 60 nm |
| 2nd layer | 1.5 | 94 nm |
| 3rd layer | 2.3 | 60 nm |

TABLE 10

| Number of initial patterns |  |  | 1 |
| --- | --- | --- | --- |
| Reproduction and mutation step | Total number of patterns after step |  | 20 |
|  | Amount of mutation | Δn | 0.1–0.5 |
|  |  | Δd | 5–25 nm |
| Selection and cross-over step | Total number of patterns after step |  | 30 |
| Selection step | Total number of patterns after step |  | 10 |
| Number of generations to be compared |  |  | 10 generations earlier |
| Second selection step | Total number of patterns after step |  | 1 |
|  | Amount of mutation | Δnss | 0.1–0.5 |
|  |  | Δdss | 5–25 nm |
|  | Number of repetitions | Nss | 1–10 |
| Target value of fitness |  | Q0 | 0.32 |

Figure 21:
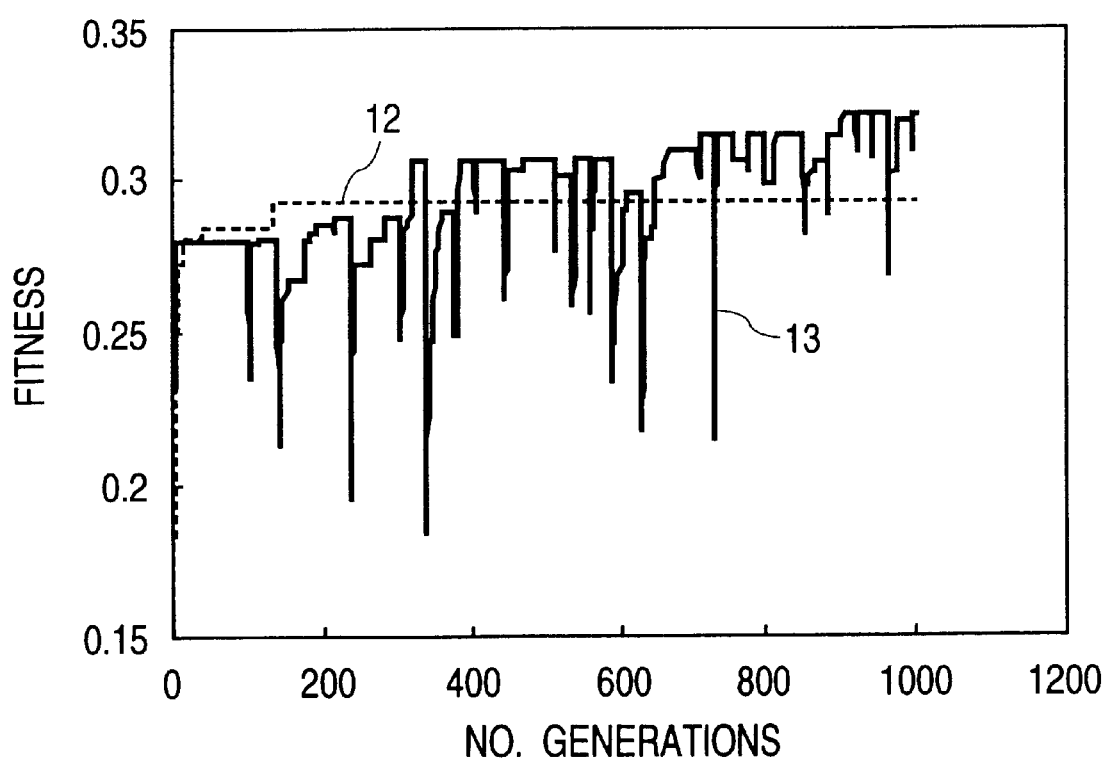
FIG. 21 shows a graph illustrating the shift of fitness with respect to the number of generations in the course of calculation for optimizing a multilayered optic filter having three layers obtained in third example of the present invention.

FIG. 21 shows the shift of fitness in the optimizing calculation with respect to the number of generations. If second initial pattern is not generated, the optimizing calculation may stall in some generations, and may risk to saturate the fitness in case of longer stall (shown as dotted line 12).

On the other hand, in the present method, when a stall is detected, second initial pattern will be generated to attempt to repeat the algorithm. The second initial pattern is a pattern mutated from the pattern having the best fitness up to the stall-detected generation. The shit of fitness in the present method with respect to the number of generations (solid line 13) abruptly drops once a stall detected, however longer stall of fitness may be avoided. Table 11 shows two multilayered structures of 3 layers, each having maximum fitness Q, the one is the case having longer stall without second initial pattern, the other is the case of the present invention having longer stall avoided with second initial pattern. It can be appreciated that by using a second initial pattern, saturation of fitness may be avoided, and a different multilayered structure may be obtained.

TABLE 11

|  | without 2nd initial | | with 2nd initial | |
| --- | --- | --- | --- | --- |
|  | Refractive index | Film thickness | Refractive index | Film thickness |
| 1st layer | 2.3 | 60 nm | 2.3 | 60 nm |
| 2nd layer | 1.5 | 94 nm | 1.5 | 94 nm |
| 3rd layer | 2.3 | 60 nm | 2.3 | 60 nm |

As can be seen from the foregoing description of the method in accordance with the present invention, multilayered optical filters having optical characteristics much closer to the desired characteristics than ever may be designed and produced.

Third Embodiment

Figure 22:
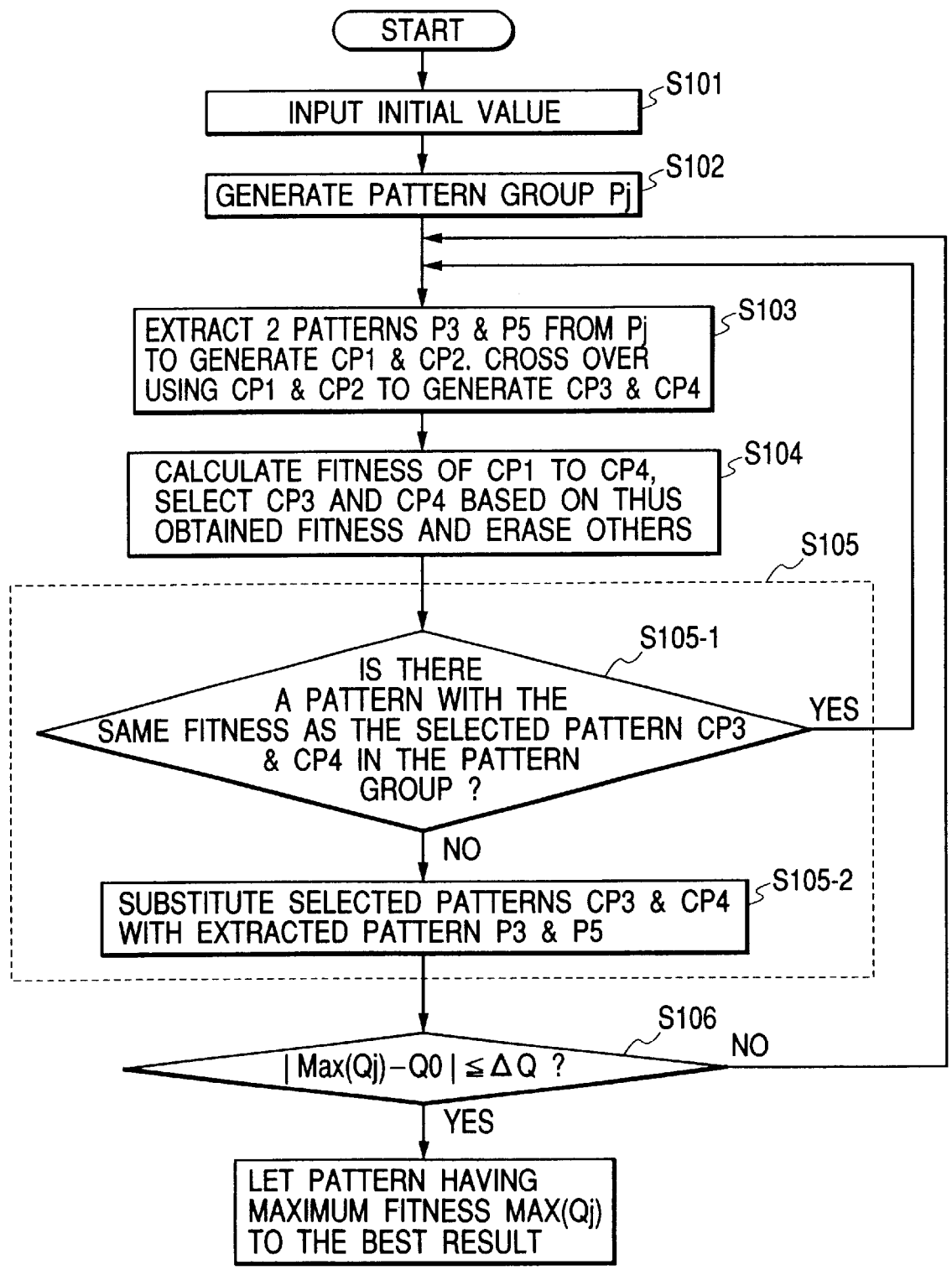
FIG. 22 shows a flowchart illustrating third preferred embodiment of the present invention.

Third preferred embodiment in accordance with the present invention will be described below in greater details with reference to the accompanying drawings. In third preferred embodiment, a method is provided comprising an algorithm including the steps of pattern groups generating process, manipulating process, selecting process, and substituting process, and the manipulating process is a crossover. FIG. 22 shows a flowchart of algorithm used in third preferred embodiment of the present invention.

Also in third preferred embodiment, when comparing patterns, the fitness of the pattern characteristics with respect to the target characteristics will be used instead of the characteristics specific to a pattern.

In step S101 parameters and initial values of the problem to be optimized are input.

The initial input values or initial range of numbers include: number of patterns j in a pattern group, number of elements i in a pattern, number of extracted patterns, number of patterns to be generated in the cross-over step, target value of fitness, and target value of fitness error. Elements Xj-1 through Xj-i in patterns may be preferably input as initial values, however these values may be determined by using.random numbers or predefined equations. Alternatively elements Xj-1 through Xj-i of some patterns in a pattern group may be input as initial and the rest of patterns may be determined by sing random numbers or predefined equations.

In third preferred embodiment some specific values will be used as shown in Table 12.

TABLE 12

Initial parameters

| | |
|---|---|
| Number of patterns j in a pattern group | 10 |
| Number of elements i in a pattern | 5 |
| Number of extracted patterns | 2 |
| Number of patterns to be generated in the cross-over | 2 |
| Target value of fitness | Q0 |
| Target value of fitness error | ΔQ |

Other initial values may or may not be required to input for determining the fitness in some optimization to be performed.

In step S102, pattern groups Pj as expressed in the following equation (21)

$$Pj=(Xj\text{-}1, Xj\text{-}2, \ldots, Xj\text{-}i) \qquad (21)$$

will be generated based on the elements Xj-1 through Xj-i in the input or predetermined patterns.

In third preferred embodiment, number of patterns in a pattern group initials to 10, number of elements in a pattern initials to 5, therefore pattern groups P1 through P10 as shown below will be generated:

$$P1 = (X1\text{-}1, X1\text{-}2, X1\text{-}3, X1\text{-}4, X1\text{-}5)$$
$$P2 = (X2\text{-}1, X2\text{-}2, X2\text{-}3, X2\text{-}4, X2\text{-}5)$$
$$\vdots$$
$$P9 = (X9\text{-}1, X9\text{-}2, X9\text{-}3, X9\text{-}4, X9\text{-}5)$$
$$P10 = (X10\text{-}1, X10\text{-}2, X10\text{-}3, X10\text{-}4, X10\text{-}5)$$

Figure 23:
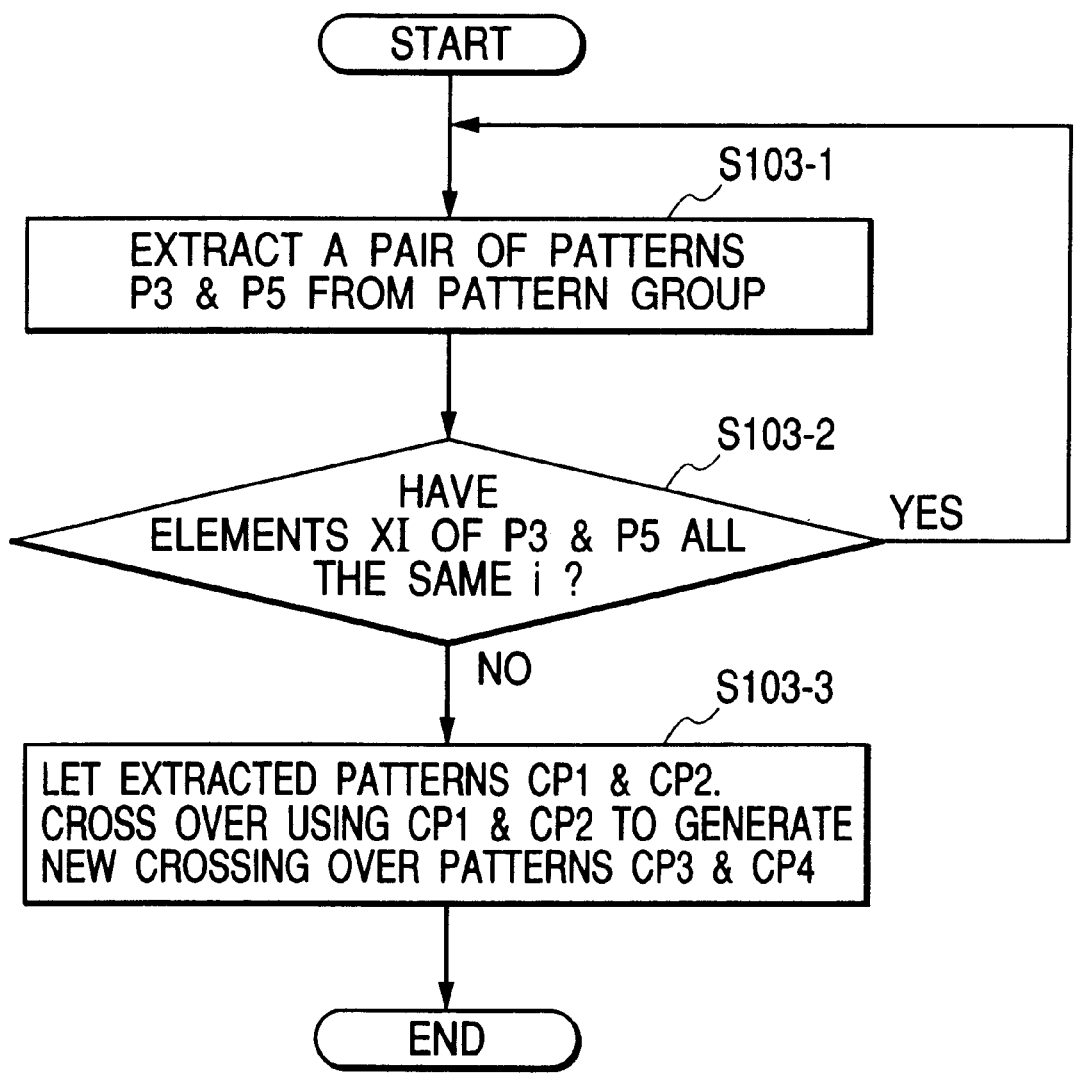
FIG. 23 shows a flowchart illustrating cross-over process shown in the flowchart of FIG. 22.

In next step S103, at least one set of pattern pairs, each comprised of mutually different elements from with in the pattern groups, may be extracted, to generate new patterns by cross over the extracted patterns (cross over process). The cross over process will be further described in greater details by referring to the flowchart of FIG. 23.

Cross over process S103 comprises the steps of extracting at least one set of a pattern pair from the pattern group (step S103-1), comparing thus.extracted patterns one with another (step S103-2), and generating a new pattern by cross over patterns which are extracted from the comparing step and which are different one from another (step S103-3).

Since the number of patterns to be extracted is 2, in step S103-1, a pair of patterns:

P3=(X3-1, X3-2, X3-3, X3-4, X3-5)
P5=(X5-1, X5-2, X5-3, X5-4, X5-5)
will be extracted from the pattern groups P1 through P10 by using a random number.

In step S103-2, elements in P3 may be compared with elements in P5 if X3-i =X5-i for each i, then it will be determined that P3=P5, the process will go back again to step S103-1 to extract one set of patterns from the pattern groups by using a random number. For i, if any of elements X3-i of P3 differs from any X5-i of P5, then it will be determined that P3≠P5, extracted patterns P3 and P5 will be CP1 and CP2. In third preferred embodiment, assuming that P3≠P5, extracted patterns CP1 and CP2 may be given by:

CP1=P3=(X3-1, X3-2, X3-3, X3-4, X3-5)
CP2=P5=(X5-1, X5-2, X5-3, X5-4, X5-5)

Next, in step S103-3, a new pattern may be generated by cross over those two patterns extracted in step S103-3. In third preferred embodiment, single point cross-over is used, however other cross-over schemes such as two-point cross-over and uniform cross-over may be used instead. Also in third preferred embodiment, the locations of elements to be crossed over are determined by a random number. The cross-over between 3rd and 4th elements of the selected patterns CP1 and CP2 respectively may result in:

$$CP1 = (X3-1, X3-2, X3-3, \quad | \quad X3-4, X3-5) \qquad (22)$$
$$\times$$
$$CP2 = (X5-1, X5-2, X5-3, \quad | \quad X5-4, X5-5)$$

Crossing over point since the number of patterns to be generated in the cross-over step is 2, two new patterns designated to as CP3 and CP4 will be generated by the cross-over:
CP3=(X3-1, X3-2, X3-3, X5-4, X5-5)
CP4=(X5-1, X5-2, X5-3, X3-4, X3-5)

However, if the number of patterns to be generated in the cross-over is more than 2, then crossed over patterns will be generated by using CP1 and CP2 after determining the locations of cross-over by a random, number.

In step S104, after calculating the fitness of the extracted patterns and new patterns generated in the cross-over, a pattern is selected which has the best fitness, and others (number of extracted patterns −1) are selected at the probability proportional to the fitness (selection process).

Figure 24:
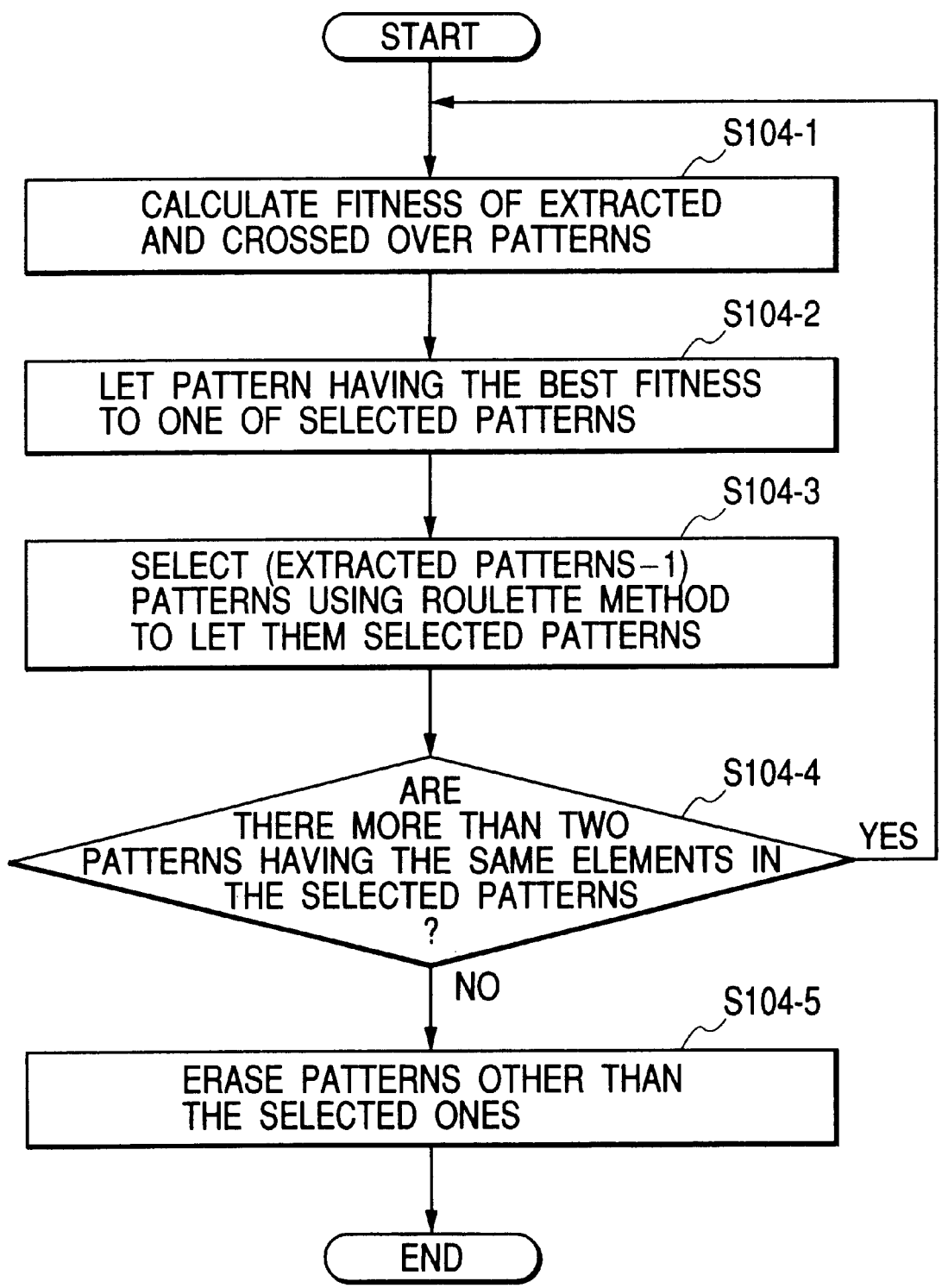
FIG. 24 shows a flowchart illustrating selection process shown in the flowchart of FIG. 22.

Selection process step S104 will be further described in greater details below by referring to the flowchart shown in FIG. 24. Selection process S104 comprises the steps S104-1 through S104-5 as described below.

In steps S104-1 through S104-5, pattern groups to be processed are comprised of the extracted patterns and the new patterns generated in the cross-over process.

In step S104-1, the fitness of the extracted patterns and the new patterns generated in the cross-over process may be calculated.

Then the highest result in the fitness calculated at step S104-1 may be designated to as the best fitness, and the patterns having the best fitness may be designated to as the best fitness pattern (step S104-2). Others (extracted patterns −1) may be selected based on the probability proportional to the fitness of patterns, and thus selected patterns may be designated to as proportional fitness patterns (step S104-3). Concerning the way to select the probability proportional to the fitness, the roulette method is commonly used in general, and is applied to third preferred embodiment of the present invention.

Next, it will be determined whether or not two or more patterns have the identical elements in the pattern group of the best fitness pattern selected in step S104-2 together with the proportional fitness patterns selected in step S104-3 (step S104-4). If there are the identical patterns then the process goes back to step S104-3 to attempt to select the proportional fitness patterns until there will have not been the identical patterns.

When there are no more than two identical patterns, the best fitness pattern selected in step S104-2 together with the proportional fitness patterns selected in step S104-3 may form selected patterns and the rest of patterns in the pattern groups to be processed will be deleted (step S104-5).

In third preferred embodiment, in the optimization in question, the characteristics obtained from each of patterns may be indicated by a function Rj (λ) for λ, and the target of optimization may be given by $Rr(\lambda)$. Thus the fitness $Qj$ for each of patterns may be given by the following equation (23):

$$Qj = \frac{1}{\left\{\sum_\lambda (Rj(\lambda) - Rr(\lambda))^2\right\}} \quad (23)$$

Although in the present embodiment, the equation (23) is used for the calculation of fitness, other equations such as:.

$$Qj = \frac{1}{\left\{\sum_\lambda |Rj(\lambda) - Rr(\lambda)|\right\}} \quad (24)$$

or $$Qj = \exp\left(\frac{1}{\left\{\sum_\lambda (Rj(\lambda) - Rr(\lambda))^2\right\}}\right) \quad (25)$$

may equally be used for the calculation. In addition, any other methods may be equally used which may express the error from the target characteristics.

Since the number of patterns to be extracted is 2, the number of selected patterns is also 2. If after step S103, for example, the fitness Qj of the extracted patterns and the patterns CP1 through CP4 generated in the cross-over is:

Q4>Q3>Q2>Q1 then through the selection process CP4 will be selected for the best fitness pattern. Since the other is to be selected at the probability proportional to the fitness, CP3 may often be selected. However if CP3=CP4 then the selection at the probability proportional to the fitness should be repeated until either CP2 or CP1 will be ultimately selected. In third preferred embodiment it is assumed that CP3≠CP4, the selected patterns will be:

CP3=(X3-1, X3-2, X3-3, X5-4, X5-5)
CP4=(X5-1, X5-2, X5-3, X3-4, X3-5)

Next, in step S105, the selected patterns are compared with each pattern in the pattern groups. If there is found in the pattern-groups no pattern having the fitness identical to the selected patterns, the selected patterns may be added to the pattern groups in place of the extracted patterns (substitution process) Substitution process S105 comprises the steps S105-1 through S105-2. In step S105-1, the fitness of the selected patterns selected in step S104 is compared with the fitness of each of patterns in the pattern groups. Comparison may be done with each element Xi in the patterns instead of fitness, however the number of comparisons will Abe larger if there are many elements. When using the fitness for the comparison only one comparison is sufficient for one pattern, resulting in lower computational cost.

In step S105-1, if a pattern having the fitness identical to the selected patterns is found in the pattern groups, then the substitution process will be bypassed to proceed the process to go back to the manipulation step (cross-over process in case of third preferred embodiment) S103 to again extract patterns. In order to simplify the extraction of patterns, it may be possible to go back to step S103-3 while retaining the extracted patterns used up to step S105 and to cross over them again. In this manner steps S103-1 and S103-2 may be omitted, allowing therefore the computational cost thereof to be saved.

In step S105-1, if no pattern having the fitness identical to the selected patterns is found in the pattern groups, then in step S105-2 the extracted patterns will be substituted with the selected patterns, which will be added to the pattern groups in place of the extracted patterns.

If the fitness of CP3 and CP4 does not match with the fitness of any patterns in the pattern group Pj, then after the substitution in step S105 the pattern group will become:

P1, P2, CP3, P4, CP4, P6, . . . , P9, P10.

When completed step S105, the fitness of each of patterns in the pattern group are to be calculated so as to compare the maximum fitness Max(Qj) with the target fitness value Q0 (step S106).

If $|\text{Max}(Qj)-Q0-| \leq \Delta Q$ then the optimization process will be terminated and the pattern having the maximum fitness Max(Qj) will be the best solution of the optimization in question.

On the other hand, if $|\text{Max}(Qj)-Q0 > \Delta Q$ then the process from the step S103 to the step S106 will be repeated with respect to-the pattern group until the error between the maximum fitness Max(Qj) obtained in step S106 and the target fitness Q0 falls into the range of the target fitness error. A sequence of process steps from step S103 to step 106 will be designated to as a generation.

Fourth Embodiment

Figure 25:
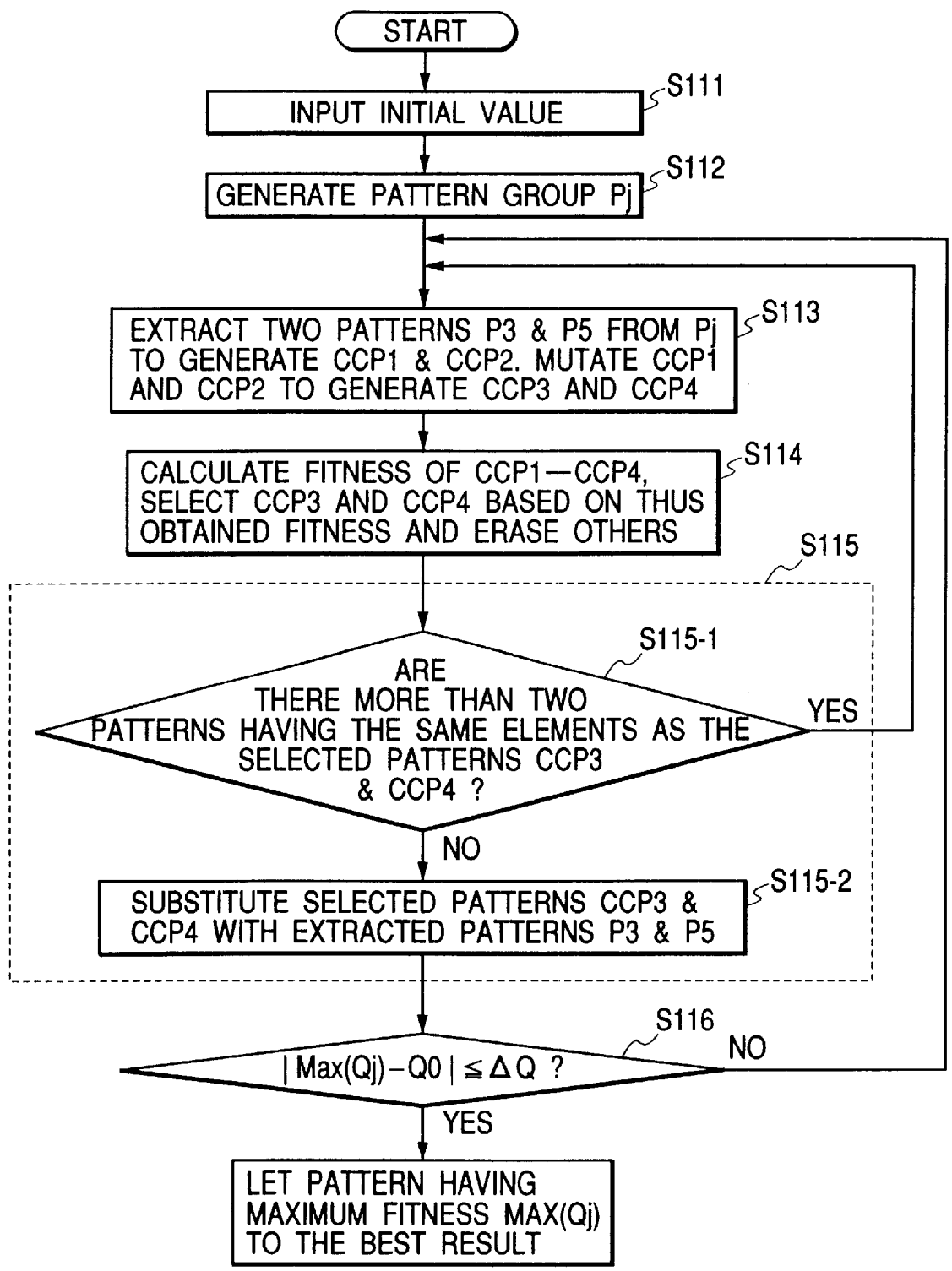
FIG. 25 shows a flowchart illustrating fourth preferred embodiment in accordance with the present invention.

Fourth preferred embodiment in accordance with the present invention will be described below in greater details with reference to the accompanying drawings. In fourth preferred embodiment, as similar to third preferred embodiment as described above, a method is provided comprising an algorithm including the steps of pattern groups generating process, manipulating process, selecting process, and substituting process. It should be noted that in fourth preferred embodiment the manipulating process is a mutation process. The way to mutate may be to increase or decrease any of elements of a pattern by the predetermined amount of mutation, or may be to substitute with one of some predetermined candidate elements. FIG. 25 shows a flowchart of the algorithm used in fourth preferred embodiment in accordance with the present invention.

Also in the preferred embodiment in accordance with the present invention, when comparing patterns, the fitness of the pattern characteristics with respect to the target characteristics will be used instead of the characteristics specific to a pattern.

In step S111 parameters and initial values of the target to be optimized are input.

The initial input values or initial range of numbers include: number of patterns j in a pattern group, number of elements i in a pattern, number of extracted patterns, number of patterns to be generated in the mutation step, amount of mutation, target value of fitness, and target value of fitness error. Elements Xj-1 through Xj-i in a pattern may be preferably input as initial values, however these values may be determined by using random numbers or predefined equations. Alternatively elements Xj-1 through Xj-i of some patterns in a pattern group may be input as initial and the rest of patterns maybe determined by sing random numbers or predefined equations.

In fourth preferred embodiment some specific values will be used as shown in Table 13.

TABLE 13

| Initial parameters | |
| --- | --- |
| Number of patterns j in a pattern group | 10 |
| Number of elements i in a pattern | 5 |
| Number of extracted patterns | 2 |
| Number of patterns to be generated in the mutation | 2 |
| Amount of mutation in the mutation process | ΔX |
| Target value of fitness | Q0 |
| Target value of fitness error | ΔQ |

Other initial values may or may not be required for determining the fitness in some optimization to be performed.

In step S112, a pattern group Pj as expressed in the following equation (21)

$$Pj=(Xj\text{-}1, Xj\text{-}2, \ldots, Xj\text{-}i) \quad (21)$$

is generated based on the input or determined elements of pattern Xj-1 through Xj-i (pattern group generating process).

In fourth preferred embodiment, number of patterns in a pattern group initials to 10, number of elements in a pattern initials to 5, therefore pattern groups P1 through P10 as shown below will be generated:

$$P1 = (X1-1, X1-2, X1-3, X1-4, X1-5)$$
$$P2 = (X2-1, X2-2, X2-3, X2-4, X2-5)$$
$$\vdots$$
$$P9 = (X9-1, X9-2, X9-3, X9-4, X9-5)$$
$$P10 = (X10-1, X10-2, X10-3, X10-4, X10-5)$$

In next step S113, a predetermined number of patterns may be extracted from within a pattern group to generate new patterns by mutating thus extracted patterns (mutation process).

Figure 26:
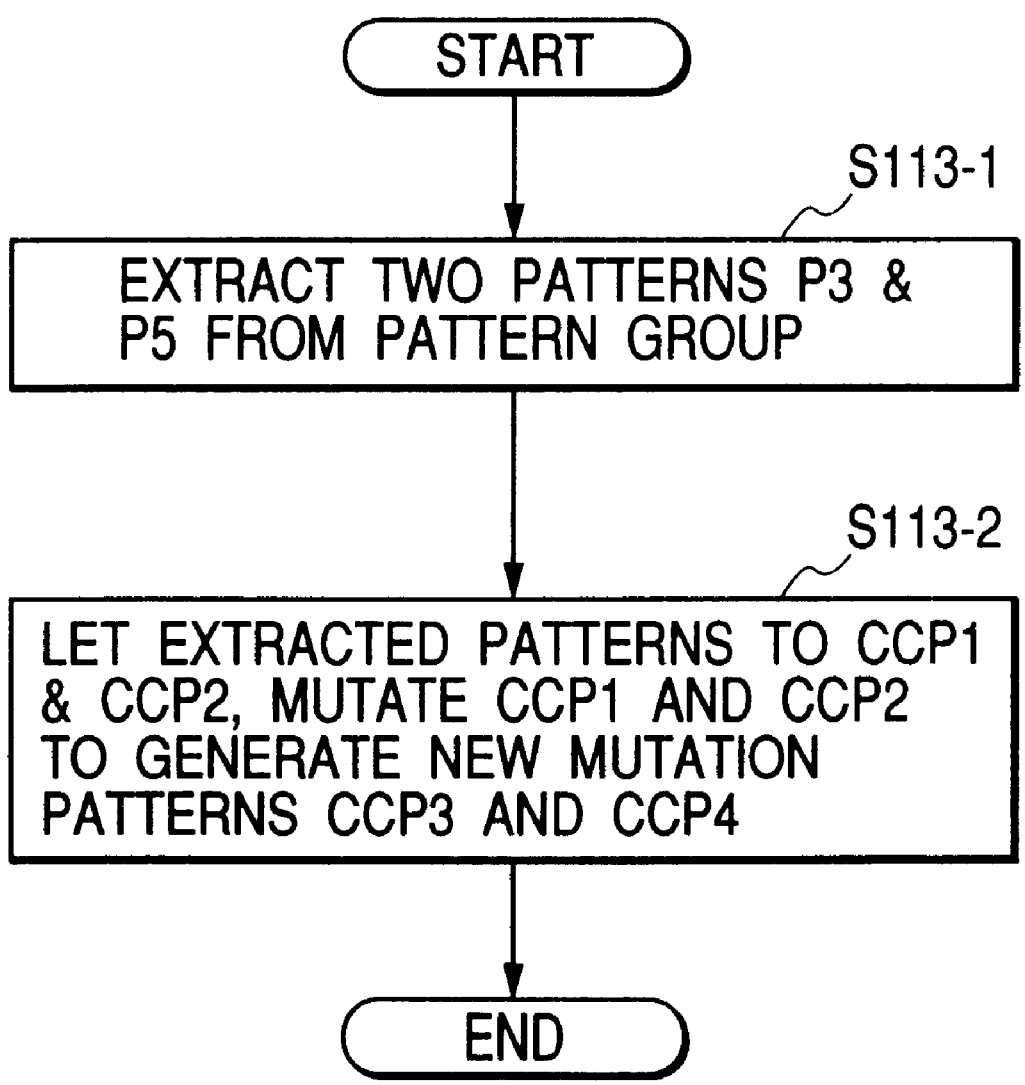
FIG. 26 shows a flowchart illustrating mutation process in the flowchart shown in FIG. 25.

Now referring to the flowchart of FIG. 26 mutation process will be further described in greater details. The mutation process S113 comprises the steps of extracting a predetermined number of patterns from within a pattern group (step S113-1), and generating new patterns by mutating extracted patterns (step S113-2).

Since the number of patterns to be extracted is 2, in step S113-1, a pair of patterns:

P3=(X3-1, X3-2, X3-3, X3-4, X3-5)
P5=(X5-1, X5-2, X5-3, X5-4, X5-5)

will be extracted from the pattern groups P1 through P10 by using a random number. These patterns P3 and P5 will be the extracted patterns CCP1 and CCP2. Thus CCP1 and CCP2 will be:

CCP1=P3=(X3-1, X3-2, X3-3, X3-4, X3-5)
CCP2=P5=(X5-1, X5-2, X5-3, X5-4,.X5-5)

Next, in step S113-2, elements in the patterns extracted at step S113-1 will be mutated to generate new patterns. The locations of elements to be mutated and the design of mutation will be determined by a random number. In the present embodiment, as the amount of mutation is designated to as ΔX, the location to be mutated will be first determined as i=4 by a random number, and when a random number provides a positive mutation+ΔX, the same manipulation will be applied to the patterns to generate a pattern CCP3 as shown below:

CCP3=(X3-1, X3-2, X3-3, X3-4+ΔX, X3-5) since the number of patterns to be generated in the mutation step is 2, two new patterns designated to as CCP3 and CCP4 will be generated by the mutation. It should be noted that the location in the elements to be mutated and the sign of mutation will be determined by a random number for each of the patterns.

CCP3=(X3-1, X3-2, X3-3, X3-4+ΔX, X3-5)
CCP4=(X5-1, X5-2-ΔX, X5-3, X5-4, X5-5)

Next, in step S114, after calculating the fitness of the extracted patterns and new patterns generated in the mutation, a pattern is selected which has the best fitness, and others (number of extracted patterns −1) are selected at the probability proportional to the fitness (selection process). The selection process is identical to that of third preferred embodiment, and therefore the detailed description thereof will be omitted.

It is assumed that two patterns, CCP3 and CCP4 are selected in the selection process.

Next, in step S115, as similar to third preferred embodiment described above, the selected patterns are compared with each pattern in the pattern groups. If and only if there is found in the pattern groups no pattern having the fitness identical to the selected patterns, the selected patterns will be added to the pattern groups in place of the extracted patterns (substitution process) The substitution process S115 comprises the steps S115-1 and S115-2, as described below.

In step S115-1, the fitness of the selected patterns selected in step S114 will be compared with the fitness of each of patterns in pattern group.

In step S115-1, if there is found in the pattern groups no pattern having the fitness identical to the selected patterns, substitution process will be omitted to proceed the process to go back to the manipulation step (mutation process in case of fourth preferred embodiment) S113 to again extract patterns. In order to simplify the extraction of patterns, it may be possible to go back to step S113-2 while retaining the extracted patterns used up to step S115 and to mutate them again.

In step S115-1, if no pattern having the fitness identical to the selected patterns is found in the pattern groups, then in step S115-2 the extracted patterns will be substituted with the selected patterns, which will be added to the pattern groups in place of the extracted patterns.

If the fitness of CCP3 and CCP4 does not match with the fitness of patterns in the pattern group Pj, then after the substitution in step S115 the pattern group will be:

P1, P2, CCP3, P4, CCP4, P6, . . . , P9, P10.

When completed step S115, the fitness of each of patterns in the pattern group are to be calculated so as to compare the maximum fitness Max(Qj) with the target fitness value Q0 (step S116).

If $$|\text{Max}(Qj)\text{-}Q0| \leq \Delta Q$$

then the optimization process will be terminated and the pattern having the maximum fitness Max(Qj) will be the best solution of the optimization in question.

On the other hand, if $$|\text{Max}(Qj)\text{-}Q0| > \Delta Q$$

then the process from the step S113 to the step S116 will be repeated with respect to the pattern group until the error between the maximum fitness Max(Qj) obtained in step S116 and the target fitness Q0 falls into the range of the target fitness error. A sequence of process steps from step S113 to step 116 will be designated to as a generation.

Fifth Embodiment

Fifth preferred embodiment in accordance with the present invention.will be described below in greater details with reference to the accompanying drawings. In fifth preferred embodiment, as similar to third preferred embodiment as described above, a method is provided comprising an algorithm including the steps of pattern groups generating process, manipulating process, selecting process, and substituting process. It should be noted that in fifth preferred embodiment the manipulating process is a combination of cross-over and mutation process steps. In fifth preferred embodiment the manipulation process will be described so as to have a cross-over step before mutation, however the manipulation process may have a mutation step before cross-over.

Figure 27:
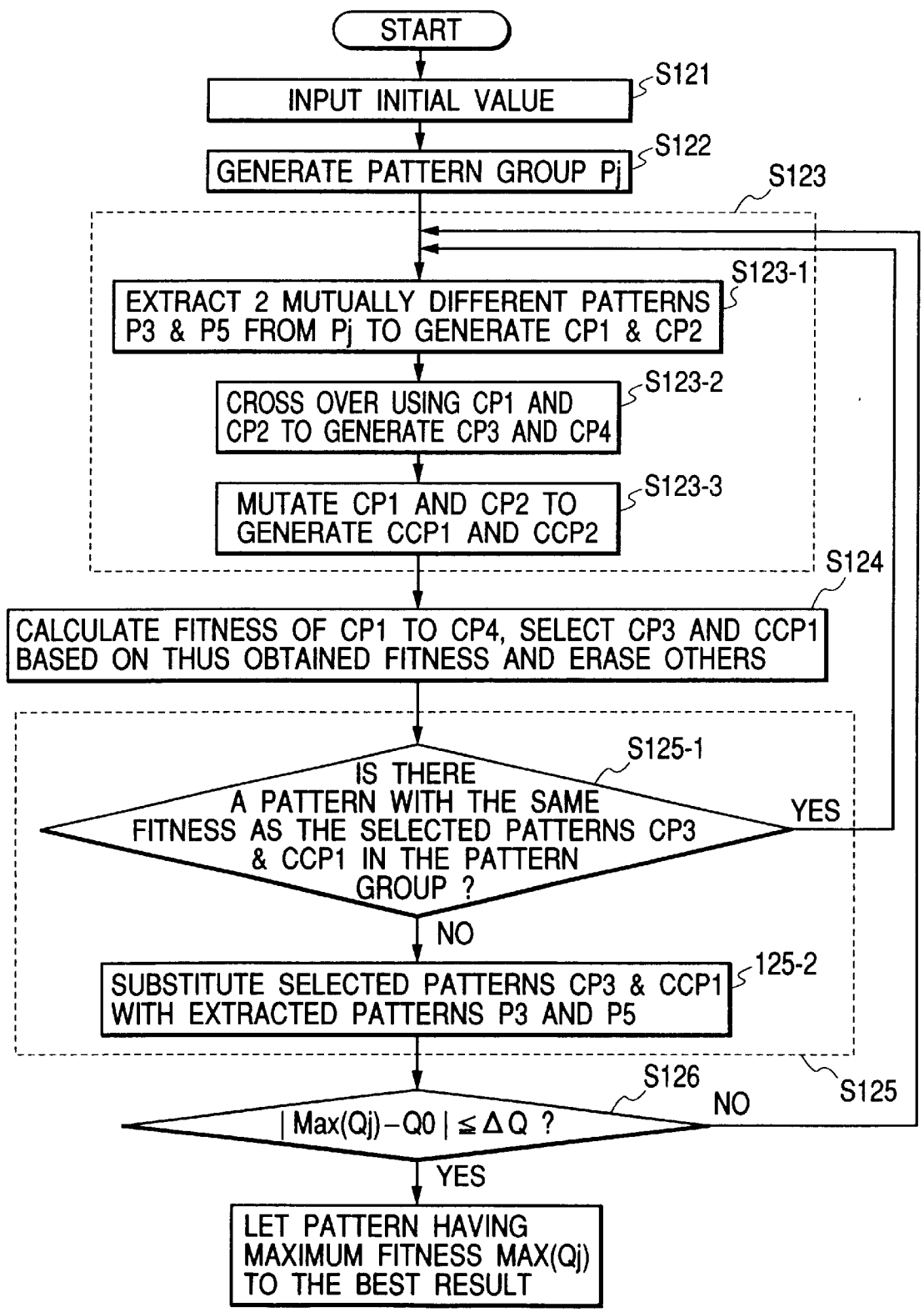
FIG. 27 shows a flowchart illustrating fifth preferred embodiment in accordance with the present invention.

FIG. 27 shows a flowchart of the algorithm used in the fifth preferred embodiment. In the present embodiment, when comparing patterns, the fitness of the pattern characteristics with respect to the target characteristics will be used instead of the characteristics specific to a pattern.

In step S121 parameters and initial values of the target to be optimized are input.

The initial input values or initial range of numbers include: number of patterns j in a pattern group, number of elements i in a pattern, number of extracted patterns, number of patterns to be generated in the cross-over step, number of patterns to be generated in the mutation step, amount of mutation, target value of fitness, and target value of fitness error. In fifth preferred embodiment some specific values will be used as shown in Table 14.

TABLE 14

| Initial parameters | |
|---|---|
| Number of patterns j in a pattern group | 10 |
| Number of elements i in a pattern | 5 |
| Number of extracted patterns | 2 |
| Number of patterns to be generated in the cross-over | 2 |
| Number of patterns to be generated in the mutation | 2 |
| Amount of mutation in the mutation process | $\Delta X$ |
| Target value of fitness | Q0 |
| Target value of fitness error | $\Delta Q$ |

Next, in step S122, a pattern group Pj will be generated based on the elements Xj-1 through Xj-i in the input or predefined patterns (pattern group generating process).

In the fifth preferred embodiment, number of patterns in a pattern group initials to 10, number of elements in a pattern initials to 5, therefore pattern groups P1 through P10 as shown below will be generated:

$P1 = (X1-1, X1-2, X1-3, X1-4, X1-5)$ $P2 = (X2-1, X2-2, X2-3, X2-4, X2-5)$

⋮

$P9 = (X9-1, X9-2, X9-3, X9-4, X9-5)$ $P10 = (X10-1, X10-2, X10-3, X10-4, X10-5)$

In next step S123, at least one set of pattern pairs, each comprised of mutually different elements from within the pattern groups, may be extracted, to form the extracted patterns (step S123-1) Then the extracted patterns are crossed over each other to generate new patterns (step S123-2) (cross over process).

Next, thus extracted patterns will be mutated to further generate new patterns (step S123-3) (mutation process).

Since the number of patterns to be extracted is 2, in step S123-1, a pair of patterns P3 and P5 mutually different will be extracted from the pattern group P1 through P10 by using a random number, and then the extracted patterns P3 and P5 will be CP1 and CP2. Thus the extracted patterns CP1 and CP2 may be:

CP1=P3=(X3-1, X3-2, X3-3, X3-4, X3-5)
CP2=P5=(X5-1, X5-2, X5-3, X5-4, X5-5)

Next, in step S123-2, those two extracted patterns are crossed over each other to generate new patterns.CP3 and CP4, and the elements in the patterns extracted in step S123-3 will be mutated to generate new patterns CCP1 and CCP2. CP3, CP4, CCP1, and CCP2 will be:

CP3=(X3-1, X3-2, X3-3, X5-4, X5-5)
CP4=(X5-1, X5-2, X5-3, X3-4, X3-5)
CCP1=(X3-1, X3-2, X3-3, X3-4+$\Delta X$, X3-5)
CCP2=(X5-1, X5-2-$\Delta X$, X5-3, X5-4, X5-5)

Next, in step S124, after calculating the fitness of the extracted patterns and new patterns generated in the mutation, a pattern is selected which has the best fitness, and others (number of extracted patterns −1) are selected at the probability proportional to the fitness (selection process). Since the selection process is identical to that of third preferred embodiment, the detailed description thereof will be omitted.

In fifth preferred embodiment, it is assumed now that two patterns, CP3 and CCP1, are selected in the selection process.

In next step S125, the selected patterns are compared with each pattern in the pattern groups, in a manner similar to third preferred embodiment. If and only if there is found in the pattern groups no pattern having the fitness identical to the selected patterns, the selected patterns may be added to the pattern groups in place of the extracted patterns (substitution process) The substitution process S125 is comprised of steps S125-1 and S125-2 as described below.

In step S125-1, the fitness of the selected patterns selected in step S124 is compared with the fitness of each of patterns in the pattern groups. If a pattern having the fitness identical to the selected patterns is found in the pattern groups in step S125-1, then the substitution process will be bypassed to proceed the process to go back to the manipulation step S123 to extract patterns again. In order to simplify the extraction of patterns, it may be possible to go back to step S123-2 while retaining the extracted patterns used up to step S125 and to cross over them again.

In step S125-1, if no pattern having the fitness identical to the selected patterns is found in the pattern groups, then in step S125-2 the extracted patterns will be substituted with the selected patterns, which will be added to the pattern groups in place of the extracted patterns.

If the fitness of CP3 and CCP1 does not match with the fitness of patterns in the pattern group Pj, then after the substitution in step S125 the pattern group will become:

P1, P2, CP3, P4, CCP1, P6, . . . , P9, P10.

When completed step S125, the fitness of each of patterns in the pattern group are to be calculated so as to compare the maximum fitness Max(Qj) with the target fitness value Q0 (step S126).

If $$|Max(Qj)-Q0| \leq \Delta Q$$

then the optimization process will be terminated and the pattern having the maximum fitness Max(Qj) will be the best solution of the optimization in question.

On the other hand, if $$|Max(Qj)-Q0| > \Delta Q$$

then the process from step S123 to step S126 will be repeated with respect to the pattern group until the error between the maximum fitness Max (Qj) obtained in step S126 and the target fitness Q0 falls into the range of the target fitness error. A sequence of process steps from step S123 to step 126 will be designated to as a generation.

In the optimization using a genetic algorithm in accordance with third through fifth preferred embodiment as described above, a pattern having the identical element may not coexist in the selected patterns, and the occupation of selected patterns by the identical pattern, thereby the best solution may be found without retrieval search being stalled at a local solution.

Sixth Embodiment

Figure 28:
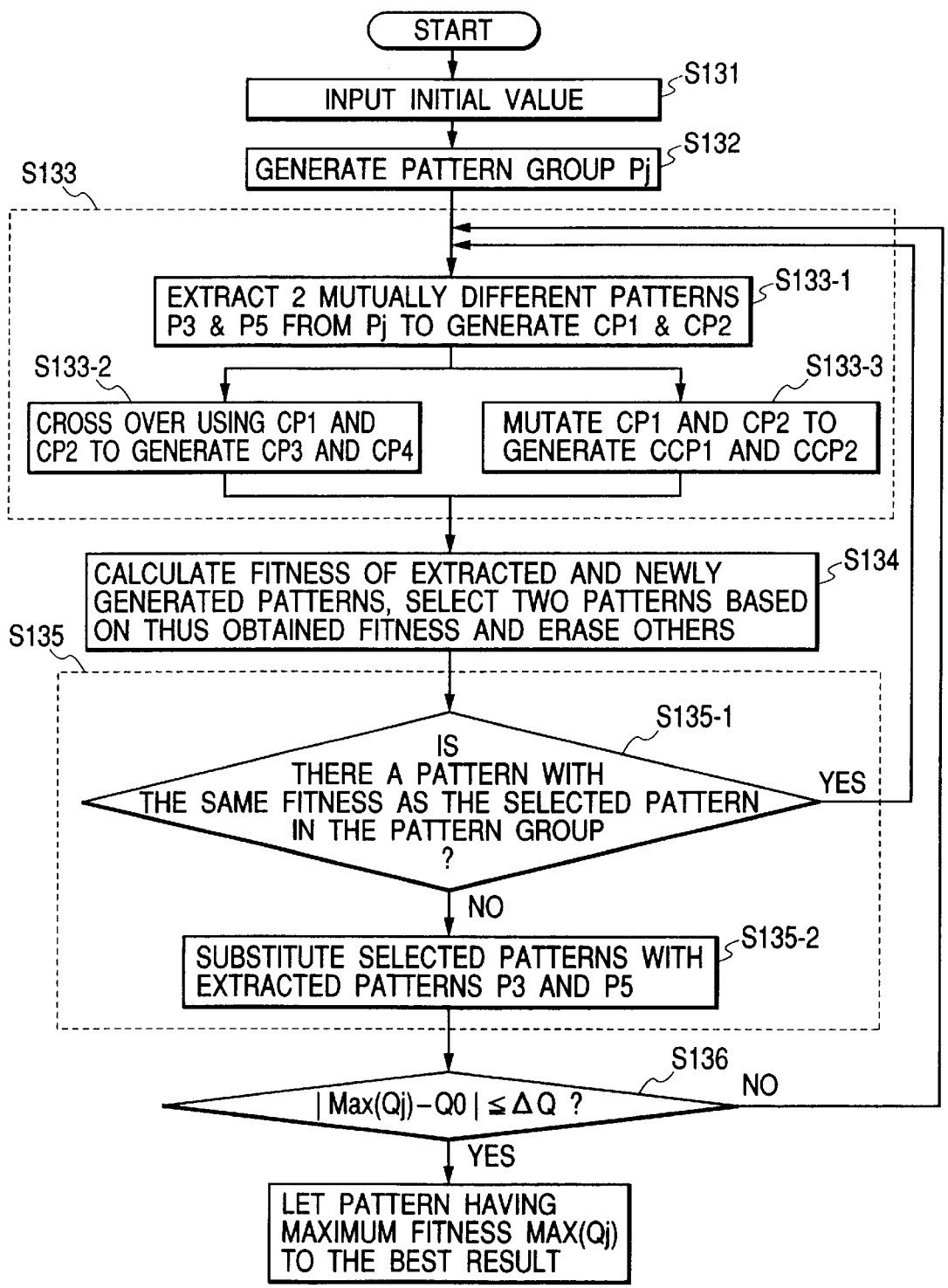
FIG. 28 shows a flowchart illustrating sixth preferred embodiment in accordance with the present invention.

In sixth embodiment of the present invention, the algorithm for searching the best solution will be described in the context of the design of multilayered optical filters. Sixth preferred embodiment comprises an algorithm including, as similar to third embodiment, the steps of pattern groups generating process, manipulating process, selecting process, and substituting process;. However in sixth preferred embodiment, in the manipulation process the cross-over and mutation will be alternately performed for each pass of algorithm. In other words, sixth preferred embodiment is equal to an algorithm, which performs alternately third and fourth preferred embodiments. FIG. 28 shows a flowchart of the algorithm used in sixth preferred embodiment of the present invention. In the present embodiment, when comparing patterns, the fitness of the pattern characteristics with respect to the target characteristics will be used instead of the characteristics specific to a pattern.

First, in step S131, parameters and initial values of the problem to be optimized are input.

In sixth preferred embodiment, the initial input values or initial range of numbers include: number of patterns j in a pattern group, number of elements i in a pattern, number of extracted patterns, number of patterns to be generated in the cross-over step, number of patterns to be generated in the mutation step, amount of mutation, target value of fitness, target value of fitness error, and parameters for operating the GA, as well as input values such as desired optical characteristics, total number of layers, refractive index of the substrate, refractive index-of incident medium, and incident angle of incident light.

Next in step S132, a pattern group is generated. In the design of multilayered optical filters, the combination of refractive index ni and thickness di of each of layers should be optimized, therefore the pattern group Pj will be expressed as:

Pj={(nj-1, dj-1), (nj-2 , dj-2 ), . . . , (nj-i, dj-i)}.

Next, in step S133, for each repetition of the generation of algorithm, cross-over process (step S133-2) for extracting at least one set of pattern pairs, each comprised of mutually different elements from within the pattern groups, to cross over thus extracted patterns to generate new patterns, and mutation process (step S133-3) for extracting a predetermined number of patterns from within the pattern group to mutate thus extracted patterns to generate new patterns, are alternately performed.

The cross-over and mutation in sixth preferred embodiment will be described in greater details below. Now it is assumed that the patterns extracted from the pattern group in sixth preferred embodiment are P3 and P5, and that those two patterns are the extracted patterns CP1 and CP2 given by:

CP1={(n3-1, d3-1), (n3-2, d3-2), (n3-3, d3-3), (n3-4, d3-4), (n3-5, d3-5)}

CP2={(n5-1, d5-1), (n5-2, d5-2), (n5-3, d5-3), (n5-4, d5-4), (n5-5, d5-5)}.

By cross over at the location between 3rd and 4th elements of patterns CP1 and CP2, new patterns CP3 and CP4 may be generated:

CP3={(n3-1, d3-1), (n3-2, d3-2), (n3-3, d3-3), (n5-4, d5-4), (n5-5, d5-5)}

CP4={(n5-1, d5-1), (n5-2, d5-2) (n5-3, d5-3), (n3-4, d3-4), (n3-5, d3-5)}

In case in which new patterns are generated by mutating the patterns CP1 and CP2, the amount of mutation will be $\Delta n$ and $\Delta d$ respectively, and a random number will be used for determining the location of mutation of elements, the sign of mutation, as well as whether the object to be mutated is the refractive index or thickness in order to generate new patterns by mutation. When new patterns CCP1 and CCP2 are generated by mutation, then CCP1 and CCP2 will be:

CCP1={(n3-1, d3-1), (n3-2, d3-2), (n3-3, d3-3), (n3-4, d3-4+L$\Delta$d), (n3-5, d3-5)}

CCP2={(n5-1, d5-1), (n5-2-$\Delta$n, d5-2), (n5-3, d5-3) (n5-4, d5-4), (n5-5, d5-5)}.

In sixth preferred embodiment, it is assumed that the manipulation starts with the cross-over and that new patterns CP3 and CP4 are generated in the manipulation process.

Next, in step S134, after calculating the fitness of the extracted patterns generated in the manipulation process and new patterns, a pattern is selected which has the best fitness, and others (number of extracted patterns −1) are selected at the probability proportional to the fitness (selection process). The selection process is similar to that in third preferred embodiment, therefore the detailed description thereof will be omitted.

Now it is assumed that two patterns CP3 and CP4 are selected in the selection process.

Next, in step, S135, the selected patterns are compared with each pattern in the pattern groups, as similar to third preferred embodiment. If and only if there is found in the pattern groups no pattern having the fitness identical to the selected patterns, the selected patterns may be added to the pattern groups in place of the extracted patterns (substitution process). Substitution process S135 comprises the steps S135-1 through S135-2 as described below.

In step S135-1, the fitness of the selected patterns selected in step S134 is compared with the fitness of each of patterns in the pattern groups.

In step S135-1, if a pattern having the fitness identical to the selected patterns is found in the pattern groups, then the substitution process will be bypassed to proceed the process to go back to the manipulation step S133 to again extract patterns. In order to skip the extraction of patterns, it may be possible to go back to step S133-2 while retaining the extracted patterns used up to step S135 and to restart with cross over or mutating them again.

In step S135-1, if no pattern having the fitness identical to the selected patterns is found in the pattern groups, then in step S135-2 the extracted patterns will be substituted with the selected patterns, which will be added to the pattern groups in place of the extracted patterns.

If the fitness of CP3 and CP4 does not match with the fitness of any patterns in the pattern group Pj, then after the substitution in step S135 the pattern group will become:

P1, P2, CP3, P4, CP4, P6, . . . . , P9, P10.

When completed step S135, the fitness of each of patterns in the pattern group are to be calculated so as to compare the-maximum fitness Max(Qj) with the target fitness value Q0 (step S136).

If $$|Max(Qj)-Q0| \leqq \Delta Q$$

then the optimization process will be terminated and the pattern having the maximum fitness Max(Qj) will be the best solution of the optimization in question.
On the other hand, if $$|Max(Qj)-Q0| > \Delta Q$$

then the process from the step S133 to the step S136 will be repeated with respect to the pattern group until the error between the maximum fitness Max(Qj) obtained in step S136 and the target fitness Q0 falls into the range of the target fitness error. A sequence of process steps from step S133 to step 136 will be designated to as a generation.

In the method in accordance with third through sixth preferred embodiment as described above, in the design of multilayered optical filters, a multilayered structure with less discrepancy to the desired optical characteristics may be obtained.

EXAMPLES

Figure 29:
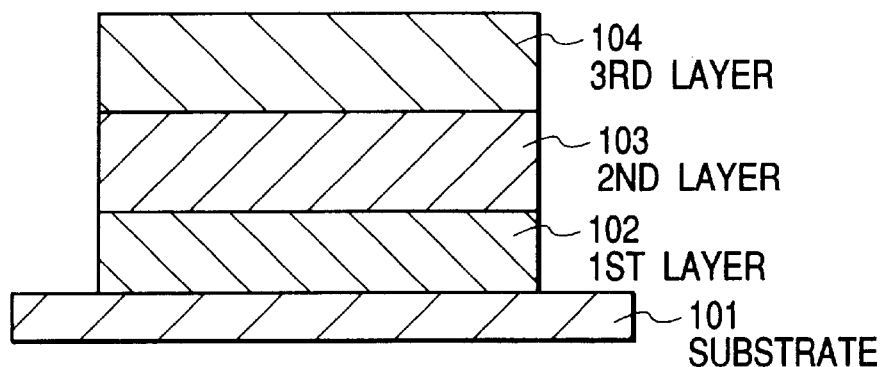
FIG. 29 shows a cross-sectional view of a multilayered optical filter with three layers, produced in accordance with fourth example of the method in accordance with the present invention.

Some examples carrying out the method of operating a genetic algorithm in accordance with the preferred embodiment of the present invention will be described below in greater details with reference to the accompanying tables and drawings. In the examples the optimization will be described with respect to a multilayered film of 3 layers, comprising the 1st layer 102, 2nd layer 103, and 3rd layer 104, for media substrate 101, as shown in FIG. 29.

The target optical characteristics in the example comprise the reflectance of 0.1 from 200 to 450 nm and from 650 to 1000 nm, and of 0.5 from 450 to 650 nm. Other characteristics will be the refractive index of substrate ns=1.5, refractive index of incident medium n0=1.0, and incident angle of incident lay θ=0 degree.

In the example 4, when comparing patterns, the fitness of the pattern characteristics with respect to the target characteristics will be used instead of the characteristics specific to a pattern. The parameters of the genetic algorithms when optimizing in the method of present embodiment will be given in Table 15 below:

TABLE 15

| Initial parameters | |
|---|---|
| Number of patterns j in a pattern group | 100 |
| Number of elements i in a pattern | 3 |
| Number of extracted patterns | 2 |
| Number of patterns to be generated in the cross-over | 2 |
| Number of patterns to be generated in the mutation | 2 |
| Amount of mutation in the mutation process | |
| Amount of refractive index | 0.1–0.5 |
| Amount of thickness (nm) | 5–25 |
| Target value of fitness | 0.32 |
| Target value of fitness error | 0.001 |

In this example, each patterns in the pattern group may be comprised of elements randomized. More specifically, in order to form a pattern group, a random number is used for selecting the refractive index ni of each layer from the group {1.5, 1.6, 1.7, 1.8, 1.9, 2.0, 2.1, 2.2, 2.3}, while a random number is used for selecting the thickness di (nm.) of each layer from the group {0, 5, 10, . . . , 195, 200}.

Figure 30:
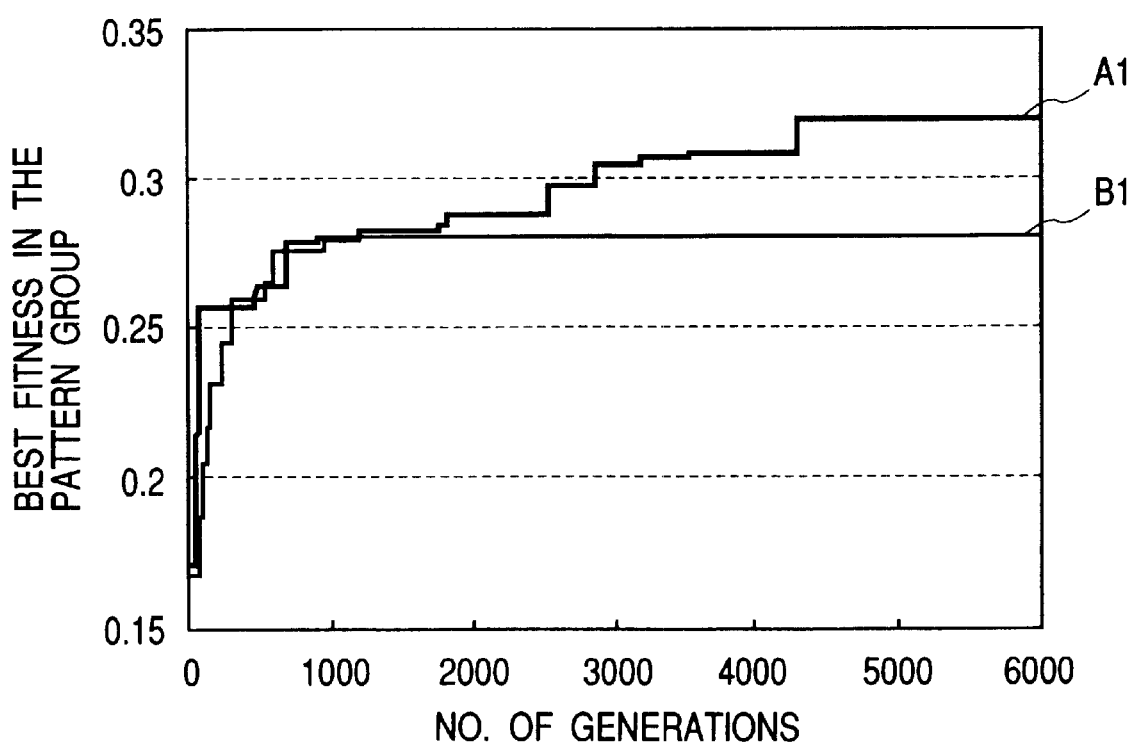
FIG. 30 shows a graph illustrating the shift of the best fitness in a pattern group with respect to the number of generations in the course of calculation for optimizing a multilayered optic filter having three layers obtained in fourth example of the method in accordance with the present invention.

The shift A1 of maximum fitness in each generation with respect to the number of generations in the process of calculation for optimization is shown in FIG. 30. In FIG. 30, the result of optimization calculation in case of genetic algorithm using the elite-roulette method in the selection step is also shown as B1. In the optimization in case of genetic algorithm using the delite-roulette method, the best fitness in each generation saturates at 0.28, stalls in a local resolution without achieving to the target fitness Q0=0.32. On the other hand, the optimization in accordance with the present invention achieved to the target fitness Q0=0.32 at the 5984th generation, having resolved the best solution.

Figure 31:
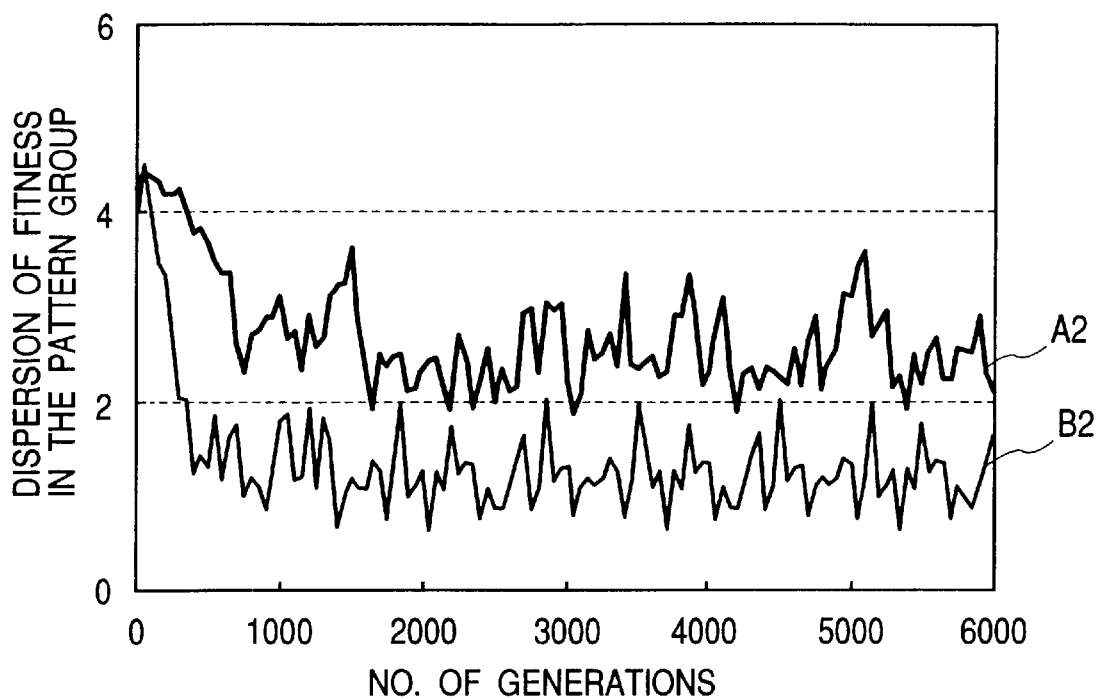
FIG. 31 shows a graph illustrating the shift of dispersion of fitness in a pattern group with respect to the number of generations in the course of calculations for optimizing a multilayered optic filter having three layers obtained in fourth example of the method in accordance with the present invention.

FIG. 31 shows the shift of dispersion A2 of the fitness of pattern group in each generation with respect to the number of generations the result of optimization calculation in case of genetic algorithm using the elite-roulette method in the selection step is also shown as B2. In the optimization in case of genetic algorithm using the elite-roulette method, the pattern group at younger generations possesses higher dispersion, however the dispersion abruptly drops when advancing the generations. Although not shown in this example, the occupation rate by the identical pattern in the pattern group was higher where the dispersion was lower.

This indicates that the pattern group was occupied by a single pattern or a pattern and its variant. Thus in such a pattern group which is occupied of a specific pattern, a pattern that has.a fitness in the proximity of the best result or that includes some effective elements may be generated but are not maintained and will be vanished.

In contrast, in accordance with the present invention, the dispersion is maintained at high level, thus the pattern group is not occupied by a specific pattern. A pattern group therefore can maintain a pattern that has its fitness in the proximity of the best solution or that includes some effective elements, and the cross-over or mutation thereafter allows the best pattern to be found without stalling on a local solution.

Figure 32:
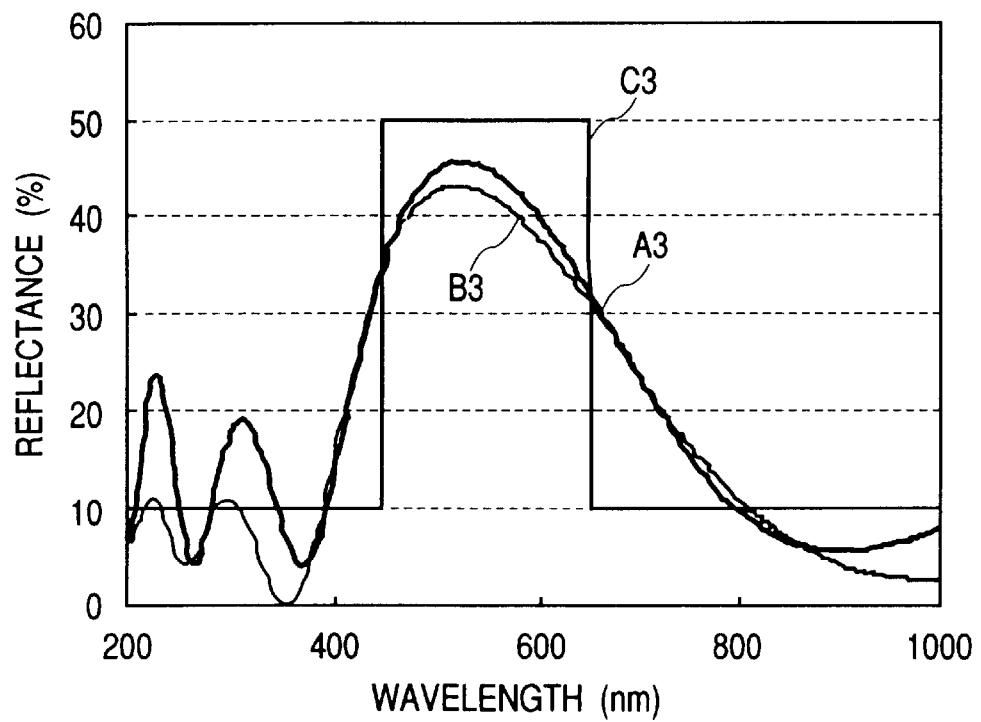
FIG. 32 shows a graph illustrating the refractive characteristics of the result of optimization of a multilayered optical filter having three layers produced in accordance with fourth example of the method of the present invention.

FIG. 32 shows the optical characteristics A3 of a multilayered optical filter having its maximum fitness Q. For the purpose of comparison, the result B3 of optimization when applying a genetic algorithms with the elite-roulette method, and the target optical characteristics C3 are also shown.

As can be seen from FIG. 32, the present method in accordance with the present invention may obtain a multilayered structure having optical characteristics much closer to the target characteristics. Table 16 shows a multilayered structure of 3 layers, optimized by the present method.

TABLE 16

|  | Refractive index | Film thickness |
| --- | --- | --- |
| 1st layer | 2.2 | 60 nm |
| 2nd layer | 1.8 | 70 nm |
| 3rd layer | 2.3 | 60 nm |

Also, by applying the method disclosed herein to a structure having more than 4 layers, a multilayered optical filter having optical characteristics much closer to the desired optical characteristics may be designed and produced.

Effect of the Invention

As have been described in the foregoing discussion, the method of producing a multilayered optical filter in accordance with the present invention may provide an optical filter comprising a multilayered structure having the best Ni and Di, without falling into a local solution, in case of designing a multilayered optical filter with a desired optical characteristics.

The search of best result by using the genetic algorithms in accordance with the present invention, prevents patterns having the identical elements from coexisting in the selected patterns, so as to avoid the occupation of selected patterns thus the pattern groups, so that the search can find the best result without stalling on a local solution.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated it is intended that the scope of the invention be defined by the claims appended hereto, and their equivalents.

What is claimed is:

1. A method of producing multilayered optical filters using a genetic algorithm, comprising:
  a generating process generating an initial pattern comprising a matrix given by $$P=(X1, X2, X3 \ldots , XS) \quad (1)$$

which is comprised of elemental matrices Xi, each of which has a refractive index and thickness of i layers (wherein i is an integer not less than 1) of a multilayered optical filter having S layers (wherein S is an integer not less than 1);
  a reproducting/mutating changing, in an arbitrary element Xi of the initial pattern, one of the refractive index and thickness of the initial pattern by a predetermined number, in terms of the initial pattern, generating a predetermined number of mutation patterns which are mutually different;
  a cross over process selecting at least one pair of patterns from the mutated patterns generated in the reproducting/mutating process and the initial patterns to cross over, in the pair of patterns selected, the matrix Xi in the pattern and/or the matrix obtained by the mutation of the matrix by the predetermined number to generate a predetermined number of crossed over patterns;
  a selecting process selecting a desired number of patterns having the most appropriate optical characteristics from the mutated pattern group generated in the reproducting/mutating process, the crossed over pattern group, and the pattern group comprised of the initial patterns; and
  a repeating process repeating a series of algorithmic processes comprised of the reproducting/mutating process, the cross over process, and the selecting process, in terms of the predetermined number of patterns selected in the selecting process, instead of the initial patterns, until the optical characteristics of the selected patterns obtained in the immediately preceding algorithmic processes, conform to a desired error range for the desired optical characteristics.

2. A method of producing multilayered optical filters using a genetic algorithm according to claim 1, wherein when repeating a sequence of algorithm processes comprised of the reproduction and mutation process, the cross-over process, and the selection process, if the optical characteristics of selected patterns obtained from the algorithm processes match with the optical characteristics of the selected patterns obtained from a preceding repetition of the algorithm processes, a second initial pattern different from the initial pattern is established for applying the sequence of algorithm processes comprising the reproduction and mutation process, the cross-over process, and the selection process.

3. A method of producing multilayered optical filters using a genetic algorithm according to claim 2, wherein the second initial pattern is a pattern generated by mutating the selected pattern having best optical characteristics obtained from a preceding repetition of process.

4. A method of producing multilayered optical filters using a genetic algorithm, comprising:
  a generating process generating a initial pattern comprising a matrix given by $$P=(X1, X2, X3 \ldots , XS) \quad (1)$$

which is comprised of elemental matrices Xi, each of which has a refractive index and thickness of i layers (wherein i is an integer not less than 1) of a multilayered optical filter having S layers (wherein S is an integer not less than 1);
  a first reproducting/mutating process duplicating a predetermined number of patterns from the initial pattern for changing, in an arbitrary element Xi of the duplicated pattern, one of the refractive index and thickness of the initial pattern by a predetermined number;
  a first selecting process selecting a desired number of patterns having the most appropriate optical characteristics from the groups consisted of the mutation patterns generated in the immediately preceding process and the initial pattern;
  a cross over process selecting at least one set of a pair of patterns from the selected patterns generated in the selection process to cross over, the matrix Xi in the pattern and/or the matrix obtained by the mutation of the matrix by the predetermined number to generate a predetermined number of crossed over patterns;

a second reproducting/mutating process selecting and replicating at least one arbitrary pattern from the pattern groups consisting of the crossed over pattern group and the selected pattern group, generating a mutated pattern by changing, in an arbitrary element Xi of the duplicated pattern and/or in an element of the matrix obtained by the mutation of the matrix by the predetermined number;

a second selection process selecting the desired number of patterns having the most appropriate optical characteristics from the pattern groups consisting of the mutated pattern group, the crossed over pattern group, and the selected pattern group; and a repeating process repeating a series of algorithmic processes comprised of the first reproducting/mutating process, the first selecting process, the cross over process, the second reproducting/mutating process, and the second selecting process, in terms of the predetermined number of patterns selected in the second selecting process instead of the initial pattern, until the optical characteristics of the second selected patterns obtained in the immediately preceding algorithmic processes, fall into a desired error range for the desired optical characteristics.

5. A method of producing multilayered optical filters using a genetic algorithm according to claim 4, wherein when repeating a sequence of algorithm processes comprised of the first reproduction and mutation process, the first selection process, the cross-over process, the second reproduction and mutation process, and the second selection process, if the optical characteristics of second selected pattern obtained from the algorithm processes match with the optical characteristics of the second selected pattern obtained from a preceding repetition of the algorithm processes, a second initial pattern different from the initial pattern is established for applying the sequence of algorithm processes comprising the first reproduction and mutation process, a the first selection process, the cross-over process, the second reproduction and mutation process, and the second selection process.

6. A method of producing multilayered optical filters using a genetic algorithm according to claim 5, wherein the second initial pattern is a pattern generated by mutating the second selected pattern having best optical characteristics obtained from a preceding of process.

7. A method of producing multilayered optical filters using a genetic algorithm according to claim 1, wherein selection in the selection process in the first and the second selection steps is performed based on an order of Qj, largest-first, Qj being given by:

$$Q = \frac{1}{\left\{\sum_\lambda (Rj(\lambda) - Rr(\lambda))^2\right\}} \quad (2)$$

where $Rj(\lambda)$ is the reflectance characteristics at each wavelength $\lambda$ obtained from the pattern combination of elements in the matrix Xi, $Rr(\lambda)$ is the desired reflectance characteristics.

8. A method of producing multilayered optical filters using a genetic algorithm according to claim 4, wherein the predetermined value of changing the refractive index and the predetermined value of changing the thickness in the second reproducting/mutating process is set to be 2 to 50 times, respectively, of the predetermined value of changing the refractive index and the predetermined value of changing the thickness in the first reproducting/mutating process.

9. A method of producing multilayered optical filters comprising a method of operating a genetic algorithm, the genetic algorithm comprising:

a pattern group generating process generating a pattern group consisting of a plurality of mutually different patterns, each of which patterns comprises elemental matrices Xi, and given by $$P=(X1, X2, X3 \ldots, XS) \quad (1);$$

a manipulating process extracting a predetermined number of patterns from the pattern group and operating on the elements of these patterns to generate operated patterns;

a selecting process selecting the number of patterns having mutually, different characteristics from the extracted patterns and operated on patterns based on characteristics obtained from the extracted and operated on patterns;

a substituting process adding predetermined patterns selected in the selecting process into the pattern group in place of the extracted patterns; and a repeating process repeating a series of algorithmic processes comprising the manipulating process, the selecting process, and the substituting process, until the best characteristics in the preceding pattern group obtained in the algorithmic processes fall into a desired error range for the desired characteristics.

10. The method of producing multilayered optical filters as recited in claim 9, wherein the elements of matrices xi of the patterns are the thickness di and refractive index ni of the layer i of a multilayered optical filter.

11. A method of producing multilayered optical filters using a genetic algorithm according to claim 4, wherein selection in the selection process in the first and the second selection steps is performed based on an order of Qj, largest-first, Qj being given by:

$$Q = \frac{1}{\left\{\sum_\lambda (Rj(\lambda) - Rr(\lambda))^2\right\}} \quad (2)$$

where $Rj(\lambda)$ is the reflectance characteristics at each wavelength $\lambda$ obtained from the pattern combination of elements in the matrix Xi, $Rr(\lambda)$ is the desired reflectance characteristics.

12. The method of producing multilayered optical filters, comprising the method of operating a genetic algorithm as recited in claim 9, wherein the manipulating process comprises a cross over process extracting at least one set of a pair of patterns consisting of mutually different elements, swapping a part of the matrix in the patterns between thus extracted pattern pair to generate crossed over patterns.

13. The method of producing multilayered optical filters, comprising the method of operating a genetic algorithm as recited in claim 9, wherein the manipulating process comprises a mutating process extracting a predetermined number of patterns, mutating a part of the matrix of the pattern in the extracted patterns to generate mutated patterns.

14. The method of producing multilayered optical filters, comprising the method of operating a genetic algorithm as recited in claim 9, wherein the manipulating process further comprises a mutating process exracting a predetermined number of patterns, mutating a part of the matrix of the pattern in the extracted patterns to generate mutated patterns.

15. The method of producing multilayered optical filters, comprising the method of operating a genetic algorithm as recited in claim 9, wherein patterns selected in the selection process comprises patterns having the best characteristics and patterns selected by a roulette method.

16. The method of producing multilayered optical filters, comprising the method of operating a genetic algorithm as recited in claim 9, wherein patterns selected in the selection process comprises patterns having the best characteristics and patterns selected by a random number method.

17. The method of producing multilayered optical filters, comprising the method of operating a genetic algorithm as recited in claim 9, wherein the substitution process comprises a comparison process comparing the characteristics of each of the patterns in a pattern group to be substituted in the substitution process with the characteristics of the selected patterns, and if there is in the pattern group to be substituted in the substitution process having the same characteristics as the characteristics of the selected patterns, the substitution process will be skipped to proceed to the manipulation process.

18. The method of producing multilayered optical filters as recited in claim 12, wherein the elements of matrices xi of the patterns are the thickness di and refractive index ni of the layer i of a multilayered optical filter.

19. The method of producing multilayered optical filters as recited in claim 13, wherein the elements of matrices xi of the patterns are the thickness di and refractive index ni of the layer i of a multilayered optical filter.

20. The method of producing multilayered optical filters as recited in claim 14, wherein the elements of matrices xi of the patterns are the thickness di and refractive index ni of the layer i of a multilayered optical filter.

21. The method of producing multilayered optical filters as reed in claim 15, wherein the elements of matrices xi of the pafterns are the thickness di and refractive index ni of the layer i of a multilayered optical filter.

22. The method of producing multilayered optical filters as recited in claim 16, wherein the elements of matrices xi of the patterns are the thickness di and refractive index ni of the layer i of a multilayered optical filter.

23. The method of producing multilayered optical filters as recited in claim 17, wherein the elements of matrices xi of the patterns are the thickness di and refractive index ni of the layer i of a multilayered optical filter.

\* \* \* \* \*

UNITED STATES PATENT AND TRADEMARK OFFICE
CERTIFICATE OF CORRECTION

PATENT NO.    : 6,542,876 B1
DATED         : April 1, 2003
INVENTOR(S)   : Toshihiro Kikuchi et al.

It is certified that error appears in the above-identified patent and that said Letters Patent is hereby corrected as shown below:

<u>Title page,</u>
Item [57], ABSTRACT,
Line 5, delete "component" and substitute -- components -- in its place; and
Line 15, delete "crossover patters" and substitute -- cross-over patterns -- in its place.

<u>Column 37,</u>
Line 38, before "the first" delete "a".

<u>Column 38,</u>
Line 16, immediately after "mutually" delete "," (comma).

<u>Column 40,</u>
Line 3, delete "pafterns" and substitute -- patterns -- in its place; and
Line 10, delete "reed" and substitute -- recited -- in its place.

Signed and Sealed this

Sixteenth Day of September, 2003

JAMES E. ROGAN
*Director of the United States Patent and Trademark Office*